US011924904B2

(12) United States Patent
Perrone et al.

(10) Patent No.: US 11,924,904 B2
(45) Date of Patent: Mar. 5, 2024

(54) CONFIGURATION PROTOCOL (DHCP) OPTIMIZATION FOR WI-FI CONNECTIVITY IN A NETWORK OF MOVING THINGS, FOR EXAMPLE, AUTONOMOUS VEHICLES

(71) Applicant: Veniam, Inc., Mountain View, CA (US)

(72) Inventors: Hernán Perrone, Oporto (PT); Lídia Miguel Barros Cerqueira, Viana do Castelo (PT); Pedro Samuel Nunes da Silva, Oporto (PT); André Manuel Longo Moreira, Vila Nova de Gaia (PT)

(73) Assignee: VENIAM, INC., Mountain View, CA (US)

( * ) Notice: Subject to any disclaimer, the term of this patent is extended or adjusted under 35 U.S.C. 154(b) by 128 days.

(21) Appl. No.: 17/389,815

(22) Filed: Jul. 30, 2021

(65) Prior Publication Data
US 2022/0070962 A1 Mar. 3, 2022

Related U.S. Application Data

(60) Provisional application No. 63/072,386, filed on Aug. 31, 2020.

(51) Int. Cl.
*H04W 24/00* (2009.01)
*H04L 61/5014* (2022.01)
(Continued)

(52) U.S. Cl.
CPC ......... *H04W 76/25* (2018.02); *H04L 61/5014* (2022.05); *H04W 24/02* (2013.01); *H04W 84/005* (2013.01); *H04W 84/12* (2013.01)

(58) Field of Classification Search
None
See application file for complete search history.

(56) References Cited

U.S. PATENT DOCUMENTS

| 2008/0112362 A1* | 5/2008 | Korus | H04W 36/0033 370/331 |
|---|---|---|---|
| 2008/0293404 A1* | 11/2008 | Scherzer | H04W 72/00 455/426.1 |

(Continued)

OTHER PUBLICATIONS

International Search Report and Written Opinion for PCT/US2021/044133, dated Nov. 1, 2021, 15 pages.

*Primary Examiner* — Abdelillah Elmejjarmi
(74) *Attorney, Agent, or Firm* — McAndrews, Held & Malloy, Ltd.

(57) ABSTRACT

Systems and methods are provided for using dynamic host configuration protocol (DHCP) optimization for supporting Wi-Fi connectivity in a network of moving things. Wi-Fi connectivity of a mobile access point (MAP) configured for deployment within a vehicle may be managed, with the managing including applying, in one or both of the mobile access point (MAP) and a dynamic host configuration protocol (DHCP) server, one or more timing measures for shortening an amount of time needed to obtain a DHCP lease associated with at least one of a plurality of Wi-Fi access points in the network, and one or more optimization measures for optimizing at least one parameter used by the mobile access point (MAP) to secure DHCP lease for connecting to a particular Wi-Fi access point from the plurality of Wi-Fi access points.

40 Claims, 17 Drawing Sheets

(51) Int. Cl.
*H04W 24/02* (2009.01)
*H04W 76/25* (2018.01)
*H04W 84/00* (2009.01)
*H04W 84/12* (2009.01)

(56) References Cited

U.S. PATENT DOCUMENTS

| | | | | |
|---|---|---|---|---|
| 2014/0122386 A1* | 5/2014 | Nahum | ............. | H04L 41/00 |
| | | | | 709/224 |
| 2015/0237527 A1 | 8/2015 | Knutson | | |
| 2015/0237827 A1* | 8/2015 | Frost | ............. | A01K 13/004 |
| | | | | 119/609 |

* cited by examiner

CONFIGURATION PROTOCOL (DHCP) OPTIMIZATION FOR WI-FI CONNECTIVITY IN A NETWORK OF MOVING THINGS, FOR EXAMPLE, AUTONOMOUS VEHICLES

CLAIM OF PRIORITY

This patent application claims priority to and benefit from U.S. Provisional Patent Application Ser. No. 63/072,386, filed Aug. 31, 2020. The above identified application is hereby incorporated herein by reference in its entirety.

CROSS-REFERENCE TO RELATED APPLICATIONS/INCORPORATION BY REFERENCE

This patent application is related to:
U.S. Provisional Patent Application Ser. No. 62/221,997, entitled "Integrated Communication Network for a Network of Moving Things," filed Sep. 22, 2015;
U.S. Provisional Patent Application Ser. No. 62/222,016, entitled "Systems and Methods for Synchronizing a Network of Moving Things," filed Sep. 22, 2015;
U.S. Provisional Patent Application Ser. No. 62/222,042, entitled "Systems and Methods for Managing a Network of Moving Things," filed Sep. 22, 2015;
U.S. Provisional Patent Application Ser. No. 62/222,066, entitled "Systems and Methods for Monitoring a Network of Moving Things," filed Sep. 22, 2015;
U.S. Provisional Patent Application Ser. No. 62/222,077, entitled "Systems and Methods for Detecting and Classifying Anomalies in a Network of Moving Things," filed Sep. 22, 2015;
U.S. Provisional Patent Application Ser. No. 62/222,098, entitled "Systems and Methods for Managing Mobility in a Network of Moving Things," filed Sep. 22, 2015;
U.S. Provisional Patent Application Ser. No. 62/222,121, entitled "Systems and Methods for Managing Connectivity a Network of Moving Things," filed Sep. 22, 2015;
U.S. Provisional Patent Application Ser. No. 62/222,135, entitled "Systems and Methods for Collecting Sensor Data in a Network of Moving Things," filed Sep. 22, 2015;
U.S. Provisional Patent Application Ser. No. 62/222,145, entitled "Systems and Methods for Interfacing with a Network of Moving Things," filed Sep. 22, 2015;
U.S. Provisional Patent Application Ser. No. 62/222,150, entitled "Systems and Methods for Interfacing with a User of a Network of Moving Things," filed Sep. 22, 2015;
U.S. Provisional Patent Application Ser. No. 62/222,168, entitled "Systems and Methods for Data Storage and Processing for a Network of Moving Things," filed Sep. 22, 2015;
U.S. Provisional Patent Application Ser. No. 62/222,183, entitled "Systems and Methods for Vehicle Traffic Management in a Network of Moving Things," filed Sep. 22, 2015;
U.S. Provisional Patent Application Ser. No. 62/222,186, entitled "Systems and Methods for Environmental Management in a Network of Moving Things," filed Sep. 22, 2015;
U.S. Provisional Patent Application Ser. No. 62/222,190, entitled "Systems and Methods for Port Management in a Network of Moving Things," filed Sep. 22, 2015;
U.S. Provisional Patent Application Ser. No. 62/222,192, entitled "Communication Network of Moving Things," filed Sep. 22, 2015;
U.S. Provisional Patent Application Ser. No. 62/244,828, entitled "Utilizing Historical Data to Correct GPS Data in a Network of Moving Things," filed Oct. 22, 2015;
U.S. Provisional Patent Application Ser. No. 62/244,930, entitled "Using Anchors to Correct GPS Data in a Network of Moving Things," filed Oct. 22, 2015;
U.S. Provisional Patent Application Ser. No. 62/246,368, entitled "Systems and Methods for Inter-Application Communication in a Network of Moving Things," filed Oct. 26, 2015;
U.S. Provisional Patent Application Ser. No. 62/246,372, entitled "Systems and Methods for Probing and Validating Communication in a Network of Moving Things," filed Oct. 26, 2015;
U.S. Provisional Patent Application Ser. No. 62/250,544, entitled "Adaptive Rate Control for Vehicular Networks," filed Nov. 4, 2015;
U.S. Provisional Patent Application Ser. No. 62/273,878, entitled "Systems and Methods for Reconfiguring and Adapting Hardware in a Network of Moving Things," filed Dec. 31, 2015;
U.S. Provisional Patent Application Ser. No. 62/253,249, entitled "Systems and Methods for Optimizing Data Gathering in a Network of Moving Things," filed Nov. 10, 2015;
U.S. Provisional Patent Application Ser. No. 62/257,421, entitled "Systems and Methods for Delay Tolerant Networking in a Network of Moving Things," filed Nov. 19, 2015;
U.S. Provisional Patent Application Ser. No. 62/265,267, entitled "Systems and Methods for Improving Coverage and Throughput of Mobile Access Points in a Network of Moving Things," filed Dec. 9, 2015;
U.S. Provisional Patent Application Ser. No. 62/270,858, entitled "Channel Coordination in a Network of Moving Things," filed Dec. 22, 2015;
U.S. Provisional Patent Application Ser. No. 62/257,854, entitled "Systems and Methods for Network Coded Mesh Networking in a Network of Moving Things," filed Nov. 20, 2015;
U.S. Provisional Patent Application Ser. No. 62/260,749, entitled "Systems and Methods for Improving Fixed Access Point Coverage in a Network of Moving Things," filed Nov. 30, 2015;
U.S. Provisional Patent Application Ser. No. 62/273,715, entitled "Systems and Methods for Managing Mobility Controllers and Their Network Interactions in a Network of Moving Things," filed Dec. 31, 2015;
U.S. Provisional Patent Application Ser. No. 62/281,432, entitled "Systems and Methods for Managing and Triggering Handovers of Mobile Access Points in a Network of Moving Things," filed Jan. 21, 2016;
U.S. Provisional Patent Application Ser. No. 62/268,188, entitled "Captive Portal-related Control and Management in a Network of Moving Things," filed Dec. 16, 2015;
U.S. Provisional Patent Application Ser. No. 62/270,678, entitled "Systems and Methods to Extrapolate High-Value Data from a Network of Moving Things," filed Dec. 22, 2015;
U.S. Provisional Patent Application Ser. No. 62/272,750, entitled "Systems and Methods for Remote Software Update and Distribution in a Network of Moving Things," filed Dec. 30, 2015;

U.S. Provisional Patent Application Ser. No. 62/278,662, entitled "Systems and Methods for Remote Configuration Update and Distribution in a Network of Moving Things," filed Jan. 14, 2016;

U.S. Provisional Patent Application Ser. No. 62/286,243, entitled "Systems and Methods for Adapting a Network of Moving Things Based on User Feedback," filed Jan. 22, 2016;

U.S. Provisional Patent Application Ser. No. 62/278,764, entitled "Systems and Methods to Guarantee Data Integrity When Building Data Analytics in a Network of Moving Things," Jan. 14, 2016;

U.S. Provisional Patent Application Ser. No. 62/286,515, entitled "Systems and Methods for Self-Initialization and Automated Bootstrapping of Mobile Access Points in a Network of Moving Things," filed Jan. 25, 2016;

U.S. Provisional Patent Application Ser. No. 62/295,602, entitled "Systems and Methods for Power Management in a Network of Moving Things," filed Feb. 16, 2016;

U.S. Provisional Patent Application Ser. No. 62/299,269, entitled "Systems and Methods for Automating and Easing the Installation and Setup of the Infrastructure Supporting a Network of Moving Things," filed Feb. 24, 2016;

U.S. Provisional Patent Application Ser. No. 62/823,736, filed Mar. 26, 2019;

U.S. Provisional Patent Application Ser. No. 62/856,448, filed Jun. 3, 2019;

U.S. Provisional Patent Application Ser. No. 62/863,393, filed Jun. 19, 2019;

U.S. Provisional Patent Application Ser. No. 62/882,900, filed Aug. 5, 2019;

U.S. Provisional Patent Application Ser. No. 62/942,231, filed Dec. 2, 2019; and U.S. Provisional Patent Application Ser. No. 62/942,232, filed Dec. 2, 2019.

Each of the above identified applications is hereby incorporated herein by reference in its entirety for all purposes.

BACKGROUND

Current communication networks may be unable to adequately support communication environments involving static and mobile nodes, including, for example, autonomous vehicles. As a non-limiting example, current communication networks are unable to support adequately a network comprising a complex array of both moving and static nodes (e.g., the Internet of moving things, autonomous vehicle networks, etc.).

Limitations and disadvantages of conventional methods and systems will become apparent to one of skill in the art, through comparison of such approaches with some aspects of the present methods and systems set forth in the remainder of this disclosure with reference to the drawings.

BRIEF SUMMARY

Various aspects of this disclosure provide communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals. In various example implementations in accordance with the present disclosure, such communication networks may be configured for supporting in-vehicle data-driven connectivity optimization in a network of moving things.

DETAILED DESCRIPTION

Figure 1:
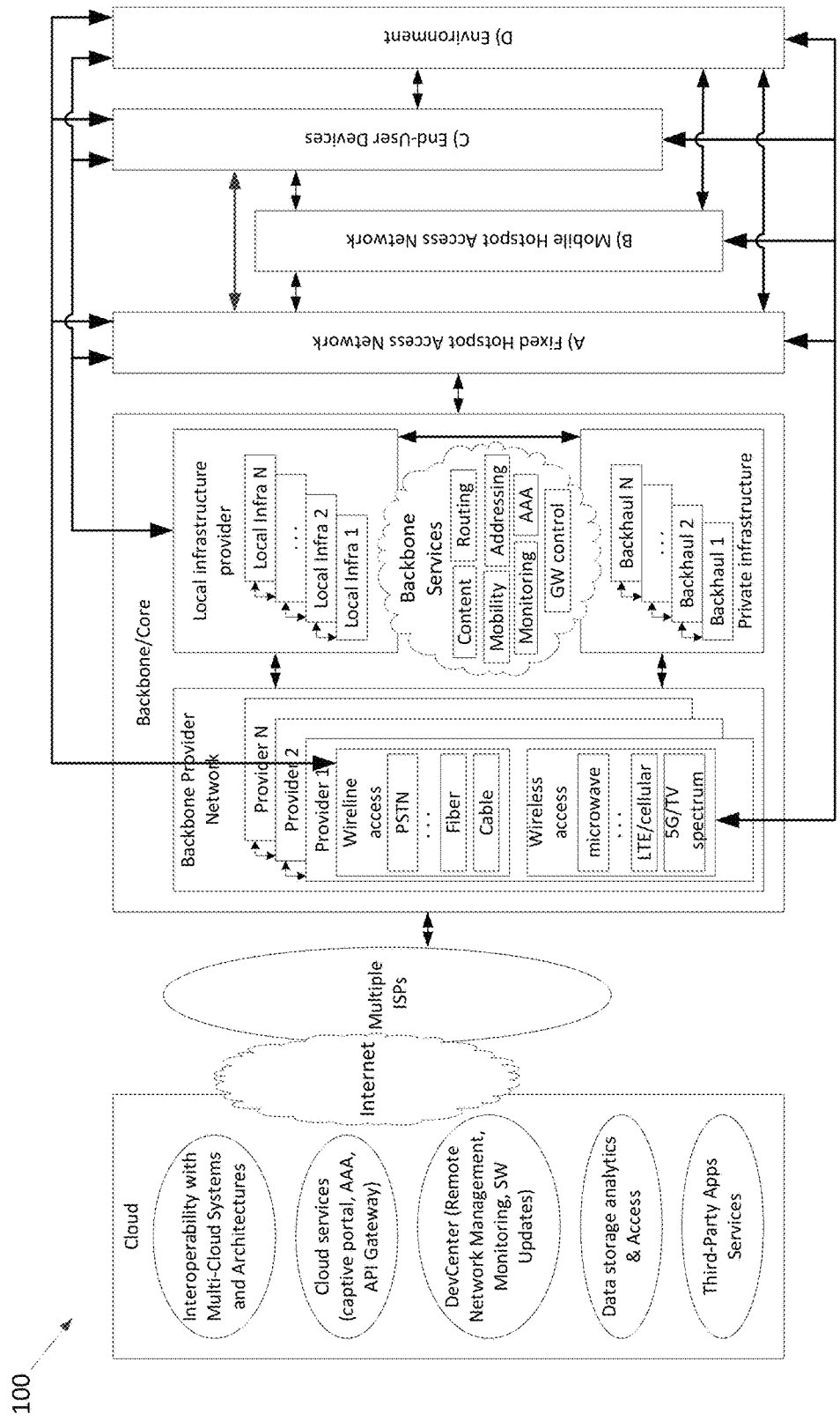
FIG. 1 shows a block diagram of a communication network, in accordance with various aspects of this disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry, for example, may operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module", for example, may refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g.," set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example, an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments, for example, may include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform, for example, may operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform, for example, may be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters, for example, may be derived locally, gathered from a neighborhood, fixed APs, the Cloud, etc. Various aspects of the platform also, for example, may ask for historical information to feed any of the decisions, where such information can be derived from historical data, from surveys, from simulators, etc. Various aspects of the platform additionally, for example, may probe or monitor decisions made throughout the network, for example to evaluate the network and/or the decisions themselves in real-time. Various aspects of the platform further, for example, may enforce the decisions in the network (e.g., after evaluating the probing results). Various aspects of the platform, for example, may establish thresholds to avoid any decision that is to be performed constantly or repeatedly without any significant advantage (e.g., technology change, certificate change, IP change, etc.). Various aspects of the platform also, for example, may learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not to be performed by the particular example subsystem or by a single subsystem. For example, the subsystems present herein may interact with each other, and data or control services may be deployed either in a centralized way, or by having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization, for example, may provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to expand effectively their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, mobile AP, MAP, etc. The OBU, for example, may comprise a plurality of networking interfaces (e.g., Wi-Fi, 802.11p, 4G, Bluetooth, UWB, etc.). The OBU, for example, may be readily installed in or on private and/or public vehicles (e.g., individual user vehicles, vehicles of private fleets, vehicles of public fleets, etc.). The OBU, for example, may be installed in transportation fleets, waste management fleets, law enforcement fleets, emergency services, road maintenance fleets, taxi fleets, aircraft fleets, etc. The OBU, for example, may be installed in or on a vehicle or other structure with free mobility or relatively limited mobility. The OBU also, for example, may be carried by a person or service animal, mounted to a bicycle, mounted to a moving machine in general, mounted to a container, etc.

The OBUs, for example, may operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets, for example, may form an overall mesh of communication links, for example including the OBUs and also fixed access points (APs) connected to the wired infrastructure (e.g., a local infrastructure, etc.). Note that OBUs herein may also be referred to as "mobile APs," "mobile hotspots," "MAPs," etc. Further, it should be noted that fixed access points may also be referred to herein as Road Side Units (RSUs), fixed APs (FAPs), etc.

In an example implementation, the OBUs may communicate with the fixed APs utilizing a relatively long-range protocol (e.g., 802.11p, etc.), and the fixed APs may, in turn, be hard wired to the wired infrastructure (e.g., via cable, tethered optical link, etc.). Note that fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU, for example, may comprise a robust vehicular networking module (e.g., a Wi-Fi connection manager)

which builds on long-range communication protocol capability (e.g., 802.11p, etc.). For example, in addition to comprising 802.11p (or other long-range protocol) capability to communicate with fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a fixed AP, may be utilized to provide a fail-over communication link, may be utilized for emergency communications, may be utilized to subscribe to local infrastructure access, etc. The cellular network interface also, for example, may be utilized to allow the deployment of solutions that are dependent on the cellular network operators.

An OBU, in accordance with various aspects of the present disclosure, may for example comprise a smart Wi-Fi connection manager that can select the best available wireless link(s) (e.g., Wi-Fi, 802.11p, cellular, vehicle mesh, etc.) with which to access the Internet. The OBU also, for example, may provide geo-location capabilities (e.g., GPS, etc.), motion detection sensors to determine if the vehicle is in motion, and a power control subsystem (e.g., to ensure that the OBU does not deplete the vehicle battery, etc.). The OBU, for example, may comprise any or all of the sensors (e.g., environmental sensors, etc.) discussed herein.

The OBU also, for example, may comprise a manager that manages machine-to-machine data acquisition and transfer (e.g., in a real-time or delay-tolerant fashion) to and from the Cloud. For example, the OBU may log and/or communicate information of the vehicles.

The OBU, for example, may comprise a connection and/or routing manager that operates to perform routing of communications in a vehicle-to-vehicle/vehicle-to-infrastructure multi-hop communication. A mobility manager (or controller, MC), for example, may ensure that communication sessions persist over one or more handoff(s) (also referred to herein as a "handover" or "handovers") (e.g., between different mobile APs, fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a fixed AP (or distributed system thereof), as part of an OBU (or a distributed system thereof), etc. Various non-limiting examples of system components and/or methods are provided in U.S. Provisional Patent Application No. 62/222, 098, filed Sep. 22, 2015, and entitled "Systems and Method for Managing Mobility in a Network of Moving Things," the entire contents of which are hereby incorporated herein by reference. Note that in an example implementation including a plurality of MCs, such MCs may be co-located and/or may be geographically distributed.

It should be understood that the term "vehicle" includes "autonomous vehicles" and "driver assisted vehicles," as well as any other type of vehicles. For example, a vehicle may be, as examples, and without limitation, a node for use on land and/or under land, watercraft for use on water and/or under water (e.g., boats, ships, speedboats, tugboats, barges, submarines, etc.), aircraft/spacecraft for use in air and/or space (e.g., drones, airplanes, satellites, etc.). The applications within a vehicle may be applicable to the operation of the vehicle, or may be applications used by a passenger in the vehicle. For example, if the vehicle is an autonomously operating bus, in addition to the vast amounts of data needed for the operation of the bus, there may be numerous passengers in the bus that are receiving data (streaming movies, songs, etc.) or transmitting data (uploading videos/pictures, chats, etc.).

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure, for example, may support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a mobile AP (e.g., a mobile Wi-Fi hotspot), offering Internet access to employees, passengers and mobile users traveling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof), for example, may be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU, for example, may process the data in any manner deemed advantageous by the system. The OBU, for example, may send the collected data (e.g., raw data, pre-processed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU, for example, may be operable to communicate with any of a variety of Wi-Fi-enabled sensor devices equipped with a heterogeneous collection of environmental sensors. Such sensors, for example, may comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors, for example, may comprise sensors and/or systems associated with on-board diagnostic (OBD) units for vehicles, autonomous vehicle driving systems, etc. Such sensors, for example, may comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors, for example, may comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to communicate periodically with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the mobile AP (e.g., vehicle-mounted sensors). Note that the sensor may also (or alternatively) be mobile (e.g., a sensor mounted to another vehicle passing by a mobile AP or fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities, for example, may quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Further, the example network 100 (and/or network components), for example, may share any or all characteristics with the other example networks (and/or network components) 200, 300, 400, 500-570, and 600, discussed herein.

The example network 100, for example, comprises a Cloud that may, for example comprise any of a variety of network level components. The Cloud, for example, may comprise any of a variety of server systems executing applications that monitor and/or control components of the network 100. Such applications also, for example, may manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud, for example, may manage interoperability with various multi-Cloud systems and architectures. Another example component (e.g., a Cloud service component), for example, may provide various Cloud services (e.g., captive portal services, authentication, authorization, and accounting (AAA) services, API Gateway services, etc.). An additional example component (e.g., a DevCenter component), for example, may provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud, for example, may be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core, for example, may comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core also, for example, may comprise one or more Local Infrastructure Providers. The Backbone/Core also, for example, may comprise a private infrastructure (e.g., run by the network 100 implementer, owner, etc.). The Backbone/Core, for example, may provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core, for example, may comprise and/or interface with different Authentication, Authorization, and Accounting (AAA) mechanisms.

The Backbone/Core Infrastructure, for example, may support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., mobile APs or OBUs (On Board Units), fixed APs or RSUs (Road Side Units), MCs (Mobility Controllers) or LMAs (Local Mobility Anchors) or Network Controllers, etc.) and/or third-party systems.

The Backbone/Core Infrastructure, for example, may comprise the ability to utilize and/or interface with different data storage/processing systems (e.g., MongoDB, MySQL, Redis, etc.). The Backbone/Core Infrastructure further, for example, may provide different levels of simultaneous access to the infrastructure, services, data, etc.

Figure 2:
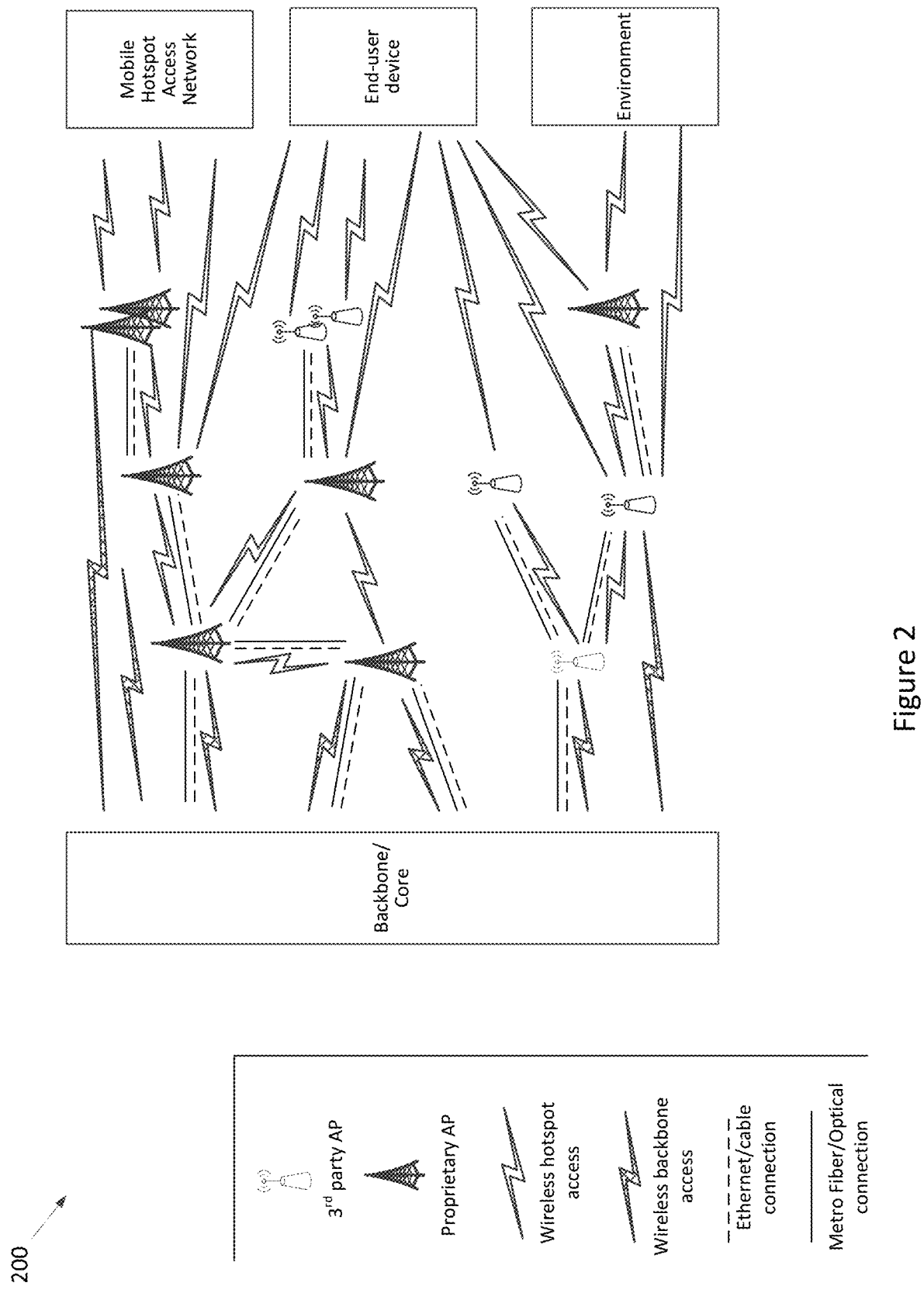
FIG. 2 shows a block diagram of a communication network, in accordance with various aspects of this disclosure.

The example network 100 also, for example, may comprise a Fixed Hotspot Access Network. Various example characteristics of such a Fixed Hotspot Access Network 200 are shown at FIG. 2. The example network 200, for example, may share any or all characteristics with the other example networks (and/or network components) 100, 300, 400, 500-570, and 600, discussed herein.

In the example network 200, the fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a fixed AP with no cable power source that can be placed virtually anywhere).

In the example network 200, the same fixed AP can simultaneously provide access to multiple fixed APs, mobile APs (e.g., vehicle OBUs, etc.), devices, user devices, sensors, things, etc. For example, a plurality of mobile hotspot access networks (e.g., OBU-based networks, etc.) may utilize the same fixed AP. Also for example, the same fixed AP can provide a plurality of simultaneous accesses to another single unit (e.g., another fixed AP, mobile AP, device, etc.), for example utilizing different channels, different radios, etc.).

Note that a plurality of fixed APs may be utilized for fault-tolerance/fail-recovery purposes. In an example implementation, a fixed AP and its fail-over AP may both be normally operational (e.g., in a same switch). Also for example, one or more fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Further, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
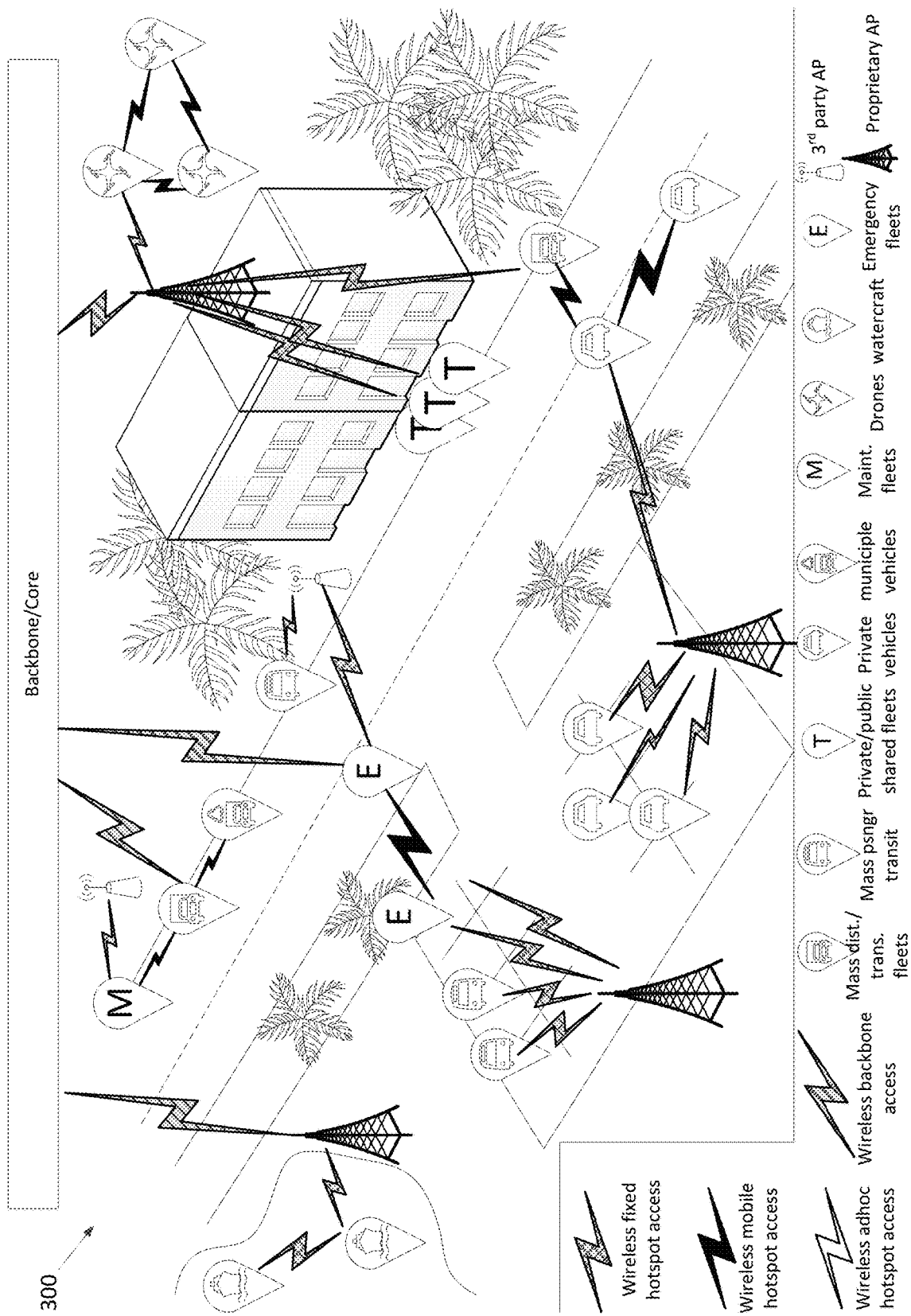
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., fixed APs) are also illustrated. The example network 300, for example, may share any or all characteristics with the other example networks (and/or network components) 100, 200, 400, 500-570, and 600, discussed herein.

The example network 300 comprises a wide variety of mobile APs (or hotspots) that provide access to user devices, provide for sensor data collection, provide multi-hop connectivity to other mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of client's networking needs, many of examples of which are provided herein. For example, two mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
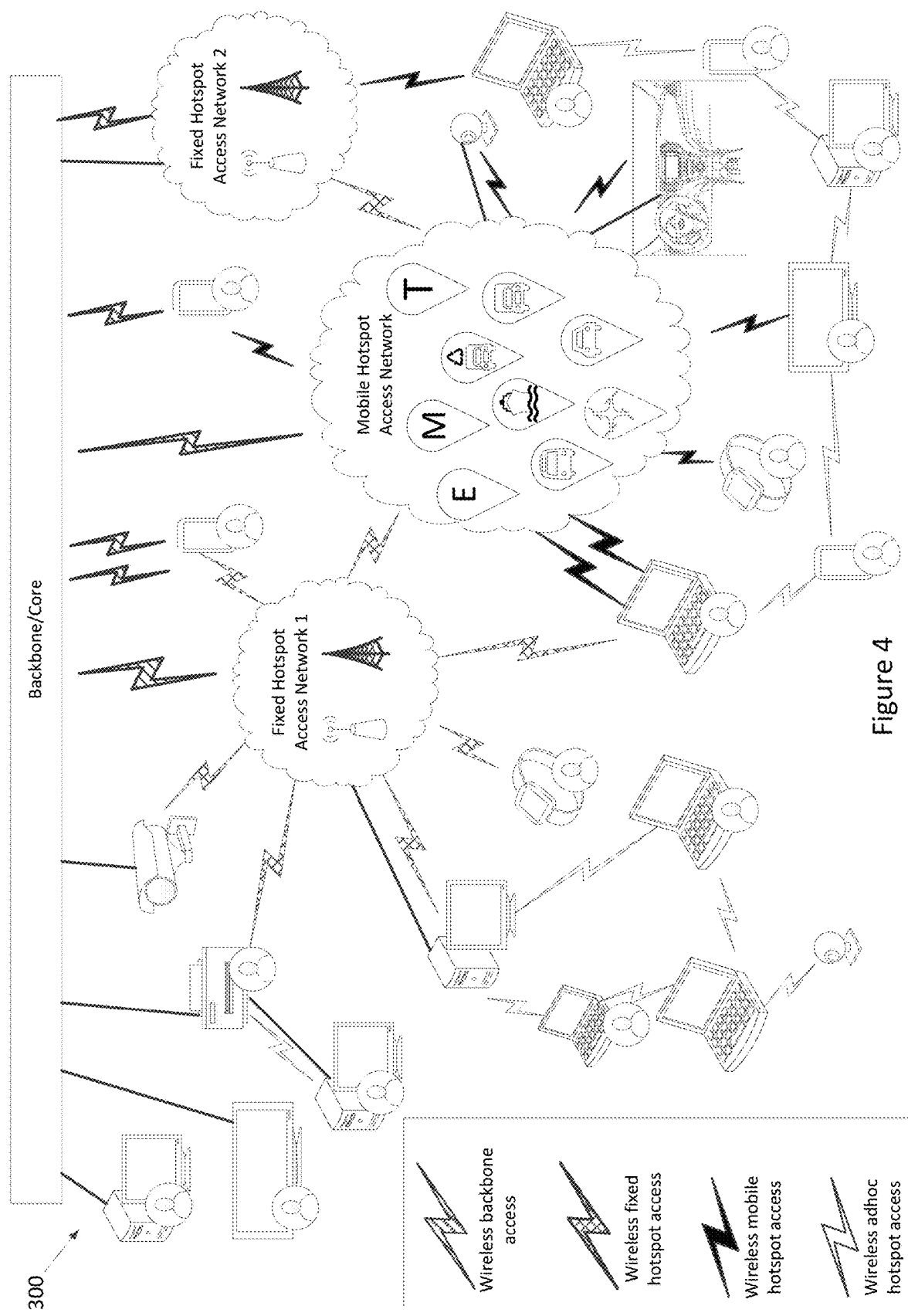
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400, for example, may share any or all characteristics with the other example networks (and/or network components) 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g., any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device, for example, may operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein), for example, may have redundant technologies to access distinct backbone, fixed hotspot, and/or mobile hotspot access networks, for example for fault-tolerance and/or load-balancing purposes (e.g., utilizing multiple SIM cards, etc.). A device also, for example, may simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

The example network 100 illustrated in FIG. 1 has a flexible architecture that is adaptable at implementation time (e.g., for different use cases) and/or adaptable in real-time, for example as network components enter and leave service.

Figure 5A:
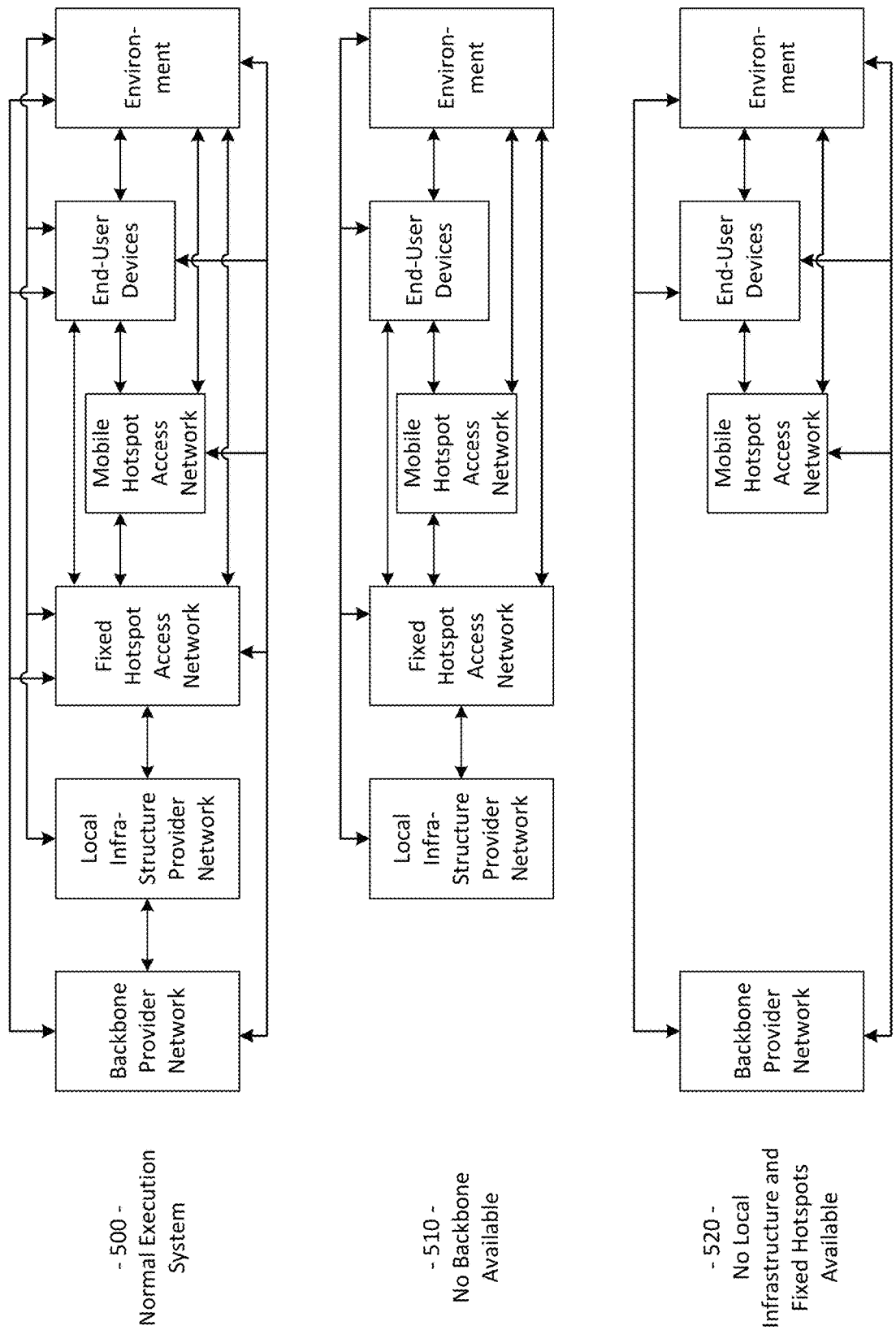
FIGS. 5A-5C show a plurality of network configurations illustrating the flexibility and/or and resiliency of a communication network, in accordance with various aspects of this disclosure.
Figure 5B:
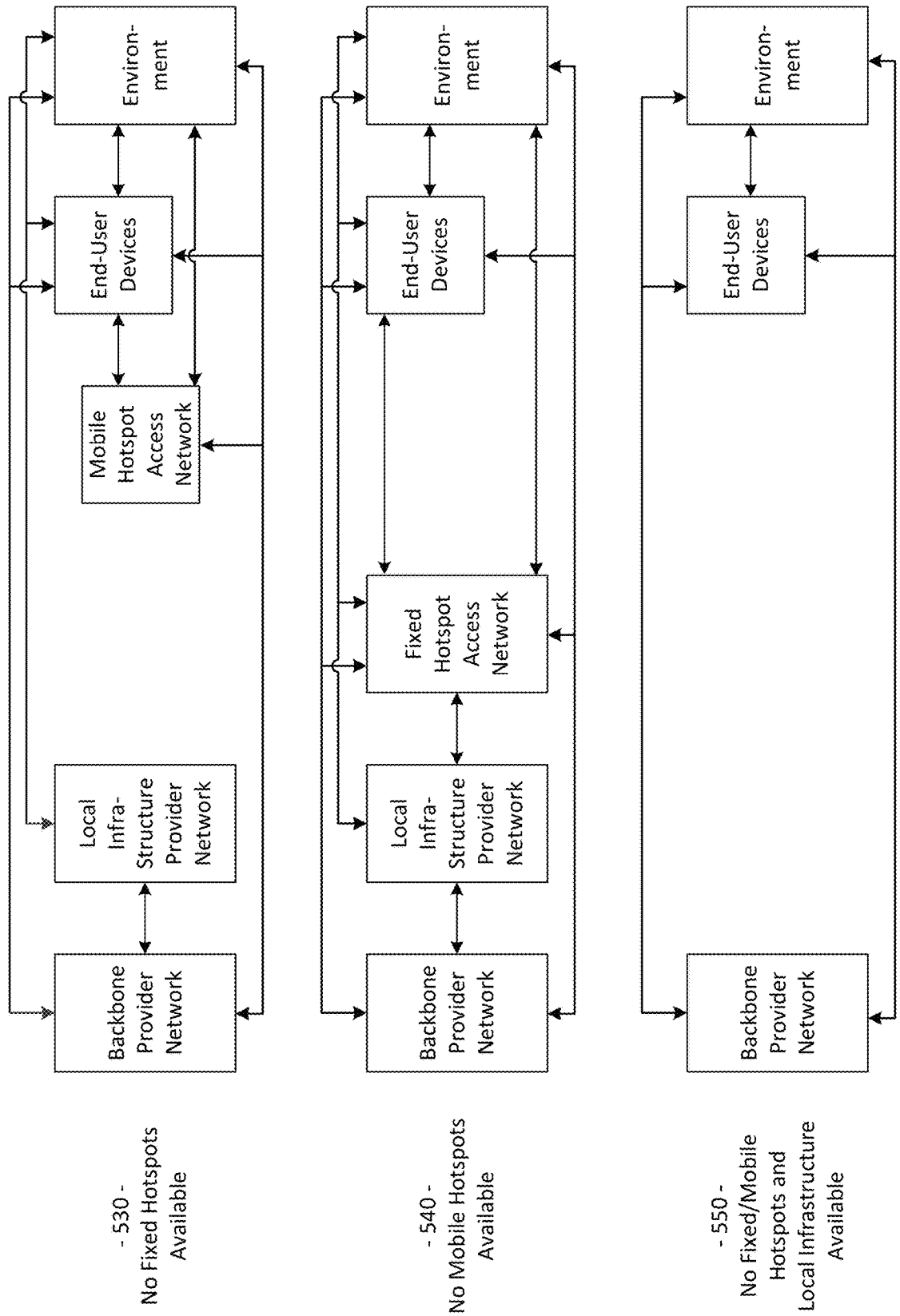
Figure 5C:
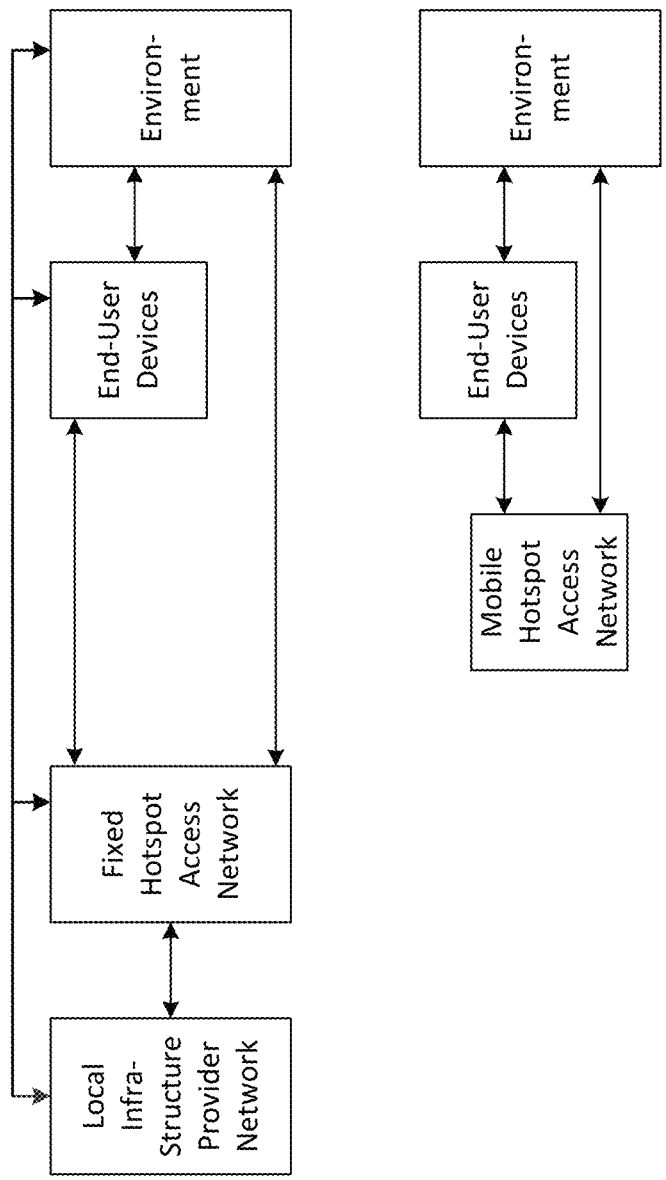

FIGS. 5A-5C illustrate such flexibility by providing example modes (or configurations). The example networks 500-570, for example, may share any or all characteristics with the other example networks (and/or network components) 100, 200, 300, 400, 600, and 700, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities, for example, may be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, such as a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Further, it should be noted that in various example implementations, any of such wireless links may comprise instead (or in addition) a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode), for example, may share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may comprise instead (or in addition) a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in mobile APs, fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode), for example, may share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may comprise instead (or in addition) a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP also, for example, may utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode), for example, may share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP also, for example, may utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530, for example, may be utilized in a scenario in which there is no fiber (or other) connection available for fixed APs (e.g., in a maritime scenario, in a plantation scenario, etc.), or in which a fixed AP is difficult to access or connect. For example, one or more mobile APs of the mobile hotspot access network may be used as gateways to reach the Cloud. The fourth example mode 530 also, for example, may be utilized when a vehicle fleet and/or the mobile APs associated therewith are owned by a first entity and the fixed APs are owned by another entity, and there is no present agreement for communication between the mobile APs and the fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode), for example, may share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with fixed APs, such communication may be utilized instead of mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode), for example, may share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 also, for example, may be utilized in rural areas in which mobile AP presence is sparse, fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode), for example, may share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the fixed APs.

Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode), for example, may share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single mobile AP, between clients of respective different mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies and/or multiple networks, connected to multiple moving/static things with multiple technologies and/or multiple networks, forming wireless (mesh) hotspot networks over different environments, connected to multiple wired/wireless infrastructure/network backbone providers, ultimately connected to the Internet, Cloud or private network infrastructure.

Figure 6:
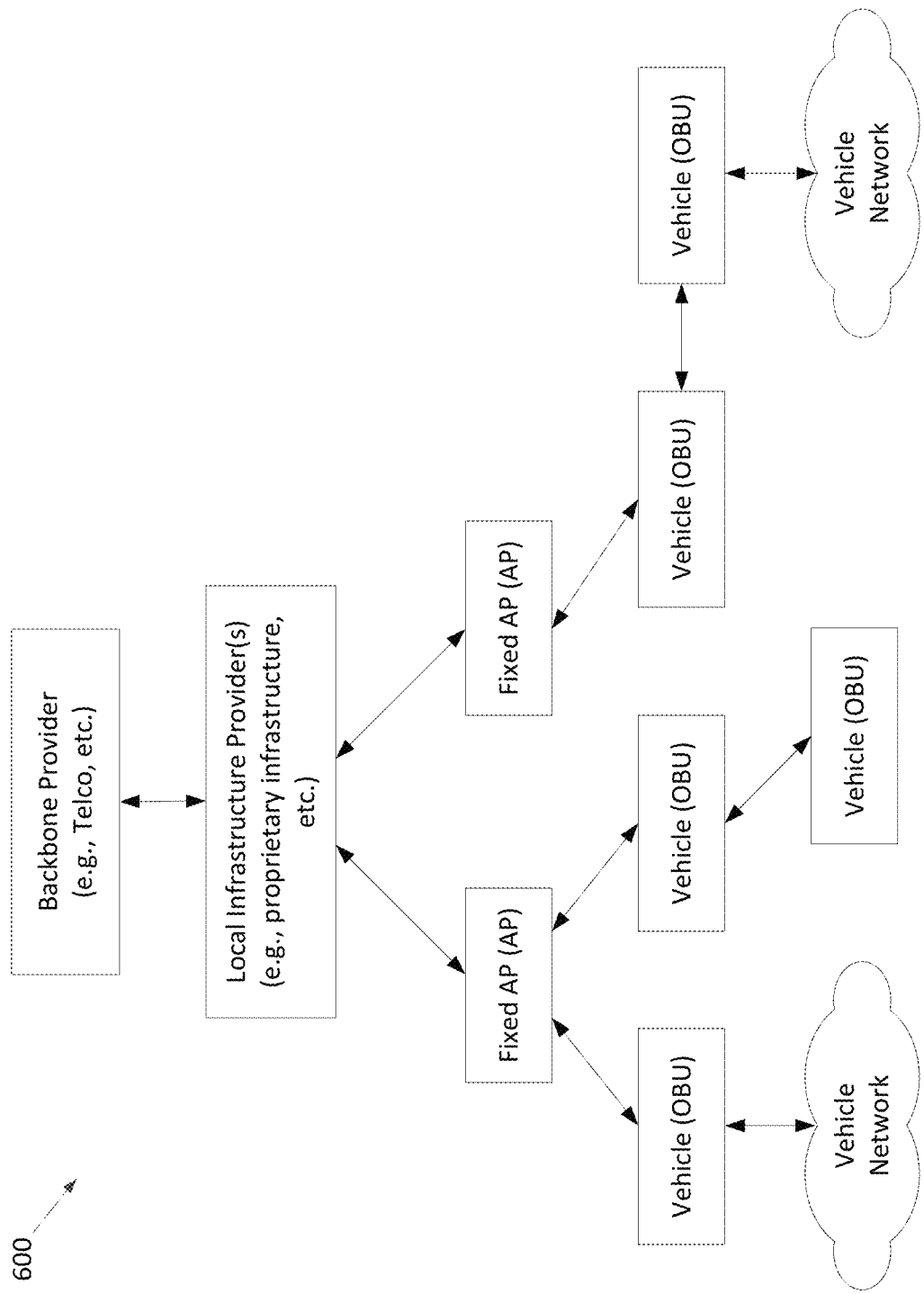
FIG. 6 shows a block diagram of an example communication network, in accordance with various aspects of the present disclosure.

FIG. 6 shows yet another block diagram of an example network configuration, in accordance with various aspects of the present disclosure. The example network 600, for example, may share any or all characteristics with the other example networks and/or network components 100, 200, 300, 400, 500-570, and 600, discussed herein. Notably, the example network 600 shows a plurality of mobile APs (or OBUs), each communicatively coupled to a fixed AP (or RSU), where each mobile AP may provide network access to a vehicle network (e.g., comprising other vehicles or vehicle networks, user devices, sensor devices, etc.).

In some instances, the various resources and/or capabilities available in networks of moving things (e.g., a vehicle network, a network of or including autonomous vehicles, etc.) may be utilized to optimize operations and/or services in such networks. In various implementations in accordance with the present disclosure, for example, such networks may be configured for supporting use of in-vehicle data-driven connectivity optimization, as described in more detail below.

In some instances, the various resources and/or capabilities available in networks of moving things (e.g., a vehicle network, a network of or including autonomous vehicles, etc.) may be utilized to optimize operations and/or services in such networks. In various implementations in accordance with the present disclosure, for example, such networks may be configured for supporting dynamic host configuration protocol (DHCP) optimization for Wi-Fi connectivity, as described in more detail below.

Figure 7:
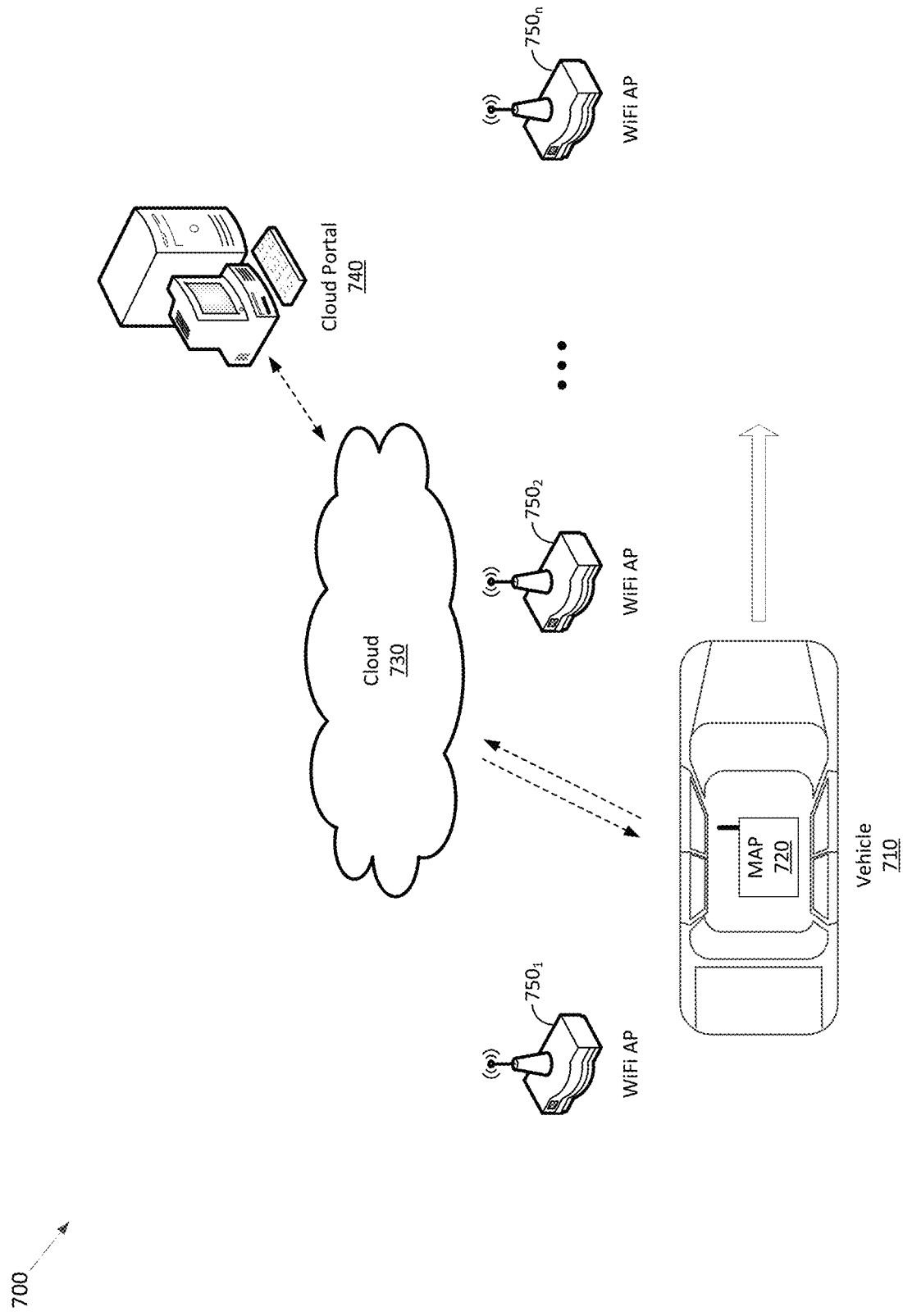
FIG. 7 shows an example communication network that supports dynamic host configuration protocol (DHCP) optimization for Wi-Fi connectivity in a network of moving things, in accordance with various aspects of the present disclosure.

FIG. 7 shows an example communication network that supports dynamic host configuration protocol (DHCP) optimization for Wi-Fi connectivity in a network of moving things, in accordance with various aspects of the present disclosure. Shown in FIG. 7 is an example network 700.

The example network 700, for example, may share any or all characteristics with the example networks 100, 200, 300, 400, 500-570, and 600 (and/or network components thereof), discussed herein. In this regard, the network 700 may be a network of moving things (e.g., a vehicle network, a network of or including autonomous vehicles, etc.), or at least a portion of such network. As shown in FIG. 7, the example network 700 comprises mobile access points (MAPs), of which MAP 720 deployed in vehicle 710 is shown, which are configured to provide online access and/or connectivity to Internet/Cloud 730, within a vehicle network (e.g., comprising other vehicles or vehicle networks, user devices, sensor devices, etc.).

The mobile APs may utilize multiple communication technologies and/or interfaces. For example, while not shown in FIG. 7, mobile access points (MAPs), such as the MAP 720, may be communicatively coupled to the Internet/Cloud 730 using dedicated short range communications (DSRC) based links, such as via fixed access points (FAPs), using cellular based links, such as via a cellular base stations, etc. Further, mobile access points (MAPs), such as the MAP 720, may also support multiple technologies and/or interfaces (e.g., Wi-Fi, Ethernet, etc.), and/or connectivity using multiple networks (e.g., corresponding to the same type or types of technologies or network interfaces), with the vehicle networks serviced by these mobile APs.

The Cloud may provide centralized support within the network 700, such as by incorporating or configuring components therein for performing various functions required for supporting operations and/or services that may need to done in centralized manner in the network 700 (e.g., where resources available in the nodes may not be adequate, where use of resources in the node may be need to be reduced, where network-level processing and/or control may be needed or desirable, etc.). In the example implementation shown in FIG. 7, for example, a cloud portal 740 (e.g., a server or any other suitable platform) may be used, and is configured to perform, manage, and control functions attributed to the Cloud.

The cloud portal 740 may comprise suitable circuitry (including, e.g., one or more of communication circuit(s), circuit(s), processing circuit(s), etc.) for performing the various functions and/or operations attributed to the cloud portal 740. Nonetheless, while the cloud portal 740 is illustrated as a single device/system, the disclosure is not so limited. In this regard, in some instances, solutions in accordance with the present disclosure may be implemented in a distributed manner, with various functions attributed to the Cloud being performed by various components of the network, including within and/or external to the Cloud 730. Thus, in some example implementations, the cloud portal 740 may be implemented in a distributed manner, with some of the functions and/or operations attributed thereto being performed by different physical devices or components that are part of and/or connected to the Internet/cloud 730.

In some instances, characteristics of communication networks like the network 700, such as mobility of certain elements therein (e.g., the mobile APs), and availability of the Internet/Cloud 730 and connectivity thereto, as well as availability of processing, storage, and communicative resources in various elements in the networks, may be used in providing services that may not otherwise be available, and/or may be used in optimizing such services. For example, the availability of processing, storage, and communicative resources in mobile APs may be utilized to take advantage of available Wi-Fi networks (both private and public), with which the mobile APs may come within their coverage, such as by moving with operating ranges of the corresponding Wi-Fi access points (e.g., Wi-Fi access points (APs) 750 in FIG. 7). In this regard, utilizing such Wi-Fi networks may be desirable, such as to enable reducing utilization of other communication resources (e.g., cellular, etc.). The mobile APs, and the communication networks comprising such mobile APs, may be configured to optimize use of such Wi-Fi networks.

In accordance with the present disclosure, the mobile APs and the communication networks comprising such mobile APs may be configured to optimize use of such Wi-Fi networks. In particular, in various implementations in accordance with the present disclosure, networks such as the network 700 may be configured to support use of dynamic host configuration protocol (DHCP) optimization.

In accordance with the present disclosure, the mobile APs and the communication networks comprising such mobile APs may be configured to optimize use of such Wi-Fi networks. In particular, in various implementations in accordance with the present disclosure, networks such as the network 700 may be configured to support use of dynamic host configuration protocol (DHCP) optimization. In this regard, in wireless networks based on the IEEE802.11 family of standards (that is, Wi-Fi networks), access points (APs), which are specific network devices, are configured to allow other devices (referred to hereinafter as "stations") to connect to and access such networks for sending and receiving data through them. In order for a station to be able to connect to a Wi-Fi network through an AP, both the station and AP may need to follow a set of protocols, such as those depending on the security (authentication and cryptography) standards and requirements implemented to protect the given network, and also provide the network configuration parameters that the station may need to use during the time it may be connected.

In the simpler cases, all the required steps of such sets of protocols may be executed between the station and the AP. In other advanced scenarios, however, depending on the network complexity, topology and management, the AP may relay to other devices (or servers) in its network, the fulfillment of one or more steps of the protocols. One of the simplest cases of such a protocol is the connection to open networks, which do not enforce any security mechanism or authentication requirements. In such use scenario, connecting the station to the AP may entail transitions among the following high level states: 1) station DISCONNECTED, 2) station AUTHENTICATED, 3) station ASSOCIATED, 4) DHCP DYNAMIC IP ADDRESS RESOLUTION, and 5) CONNECTED. The transition from one state to the next may require the execution of several steps and/or may entail following specific protocols, and depending on many factors each transition may take some time (e.g., a few milliseconds up to tens of seconds) to complete.

Nonetheless, the total amount of time required to connect the station to a Wi-Fi network, including all time needed to complete all required transitions and related steps (also referred to hereinafter as "connecting time") may not be relevant in many instances, such as for a static station or even a moving station (e.g., where the station is moving very slowly), as the station may remain within the AP coverage range for comparatively long time (e.g., minutes to hours), rendering the connecting time relatively negligible. An example use scenario where this may be the case is where a station (e.g., notebook, tablet, smartphone, or other Wi-Fi enabled device) is being used at a home or office, and thus is connecting to the home or office a Wi-Fi network. Another similar example use scenario is where users are accessing public Wi-Fi networks with their smartphones, even when walking, may stay within the AP coverage area for an extended period of time (e.g., few minutes).

However, in other instances the connecting time may become significant, thus adversely affecting the user experience and quality thereof. This may be the case, for example, where stations are moving at speed (e.g., vehicle based stations), where such stations may remain within an AP's coverage area for relatively a very short time (e.g., 30 seconds or less), and as such the time required to connect to the AP becomes comparatively significant—that is taking significant portion of the total amount of time the station would have been connected, and thus significantly reducing the time the station is effectively connected to the network. This is illustrated in FIGS. 8 and 9.

Figure 8:
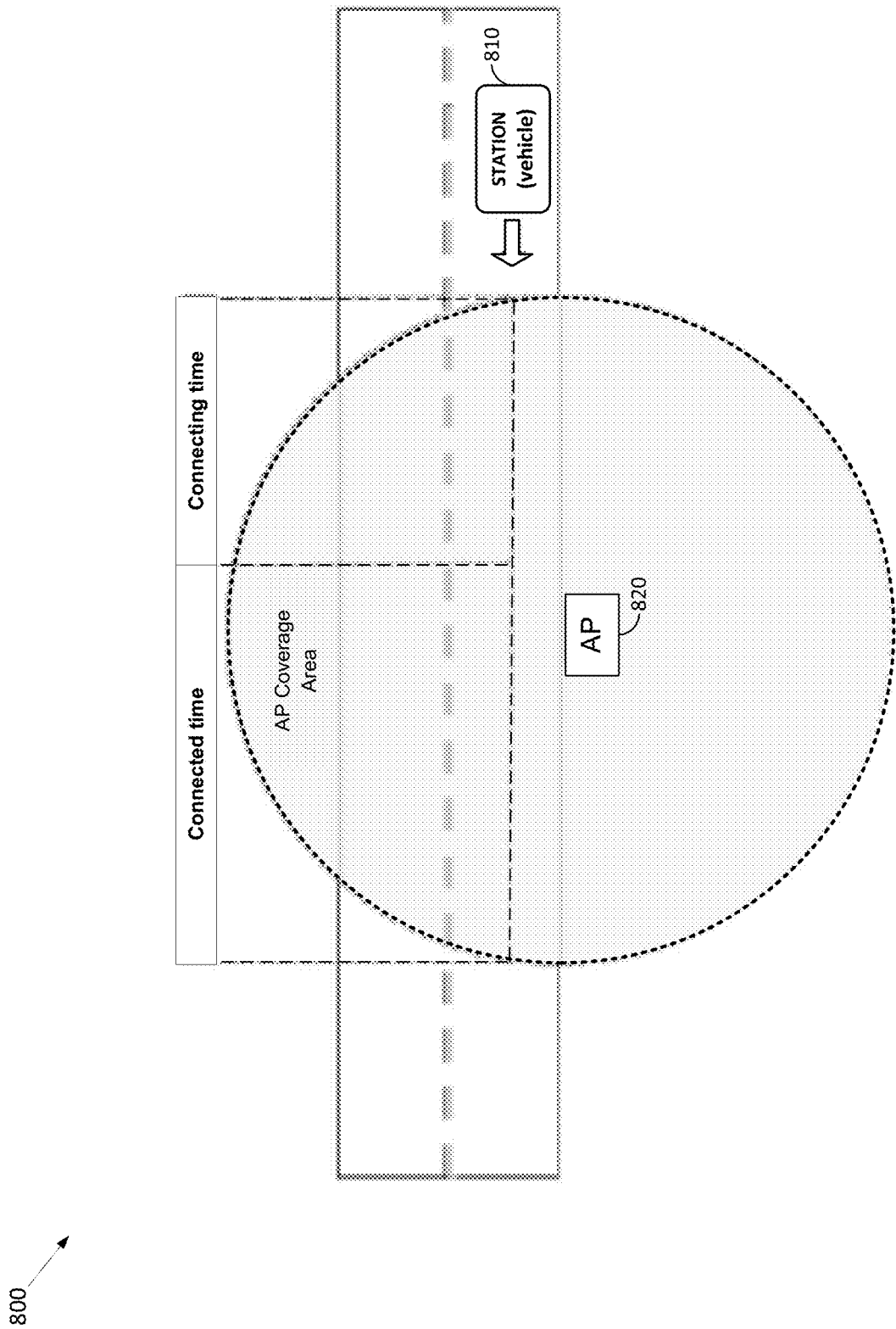
FIG. 8 shows an example use scenario with a moving station connecting to a Wi-Fi access point.
Figure 9:
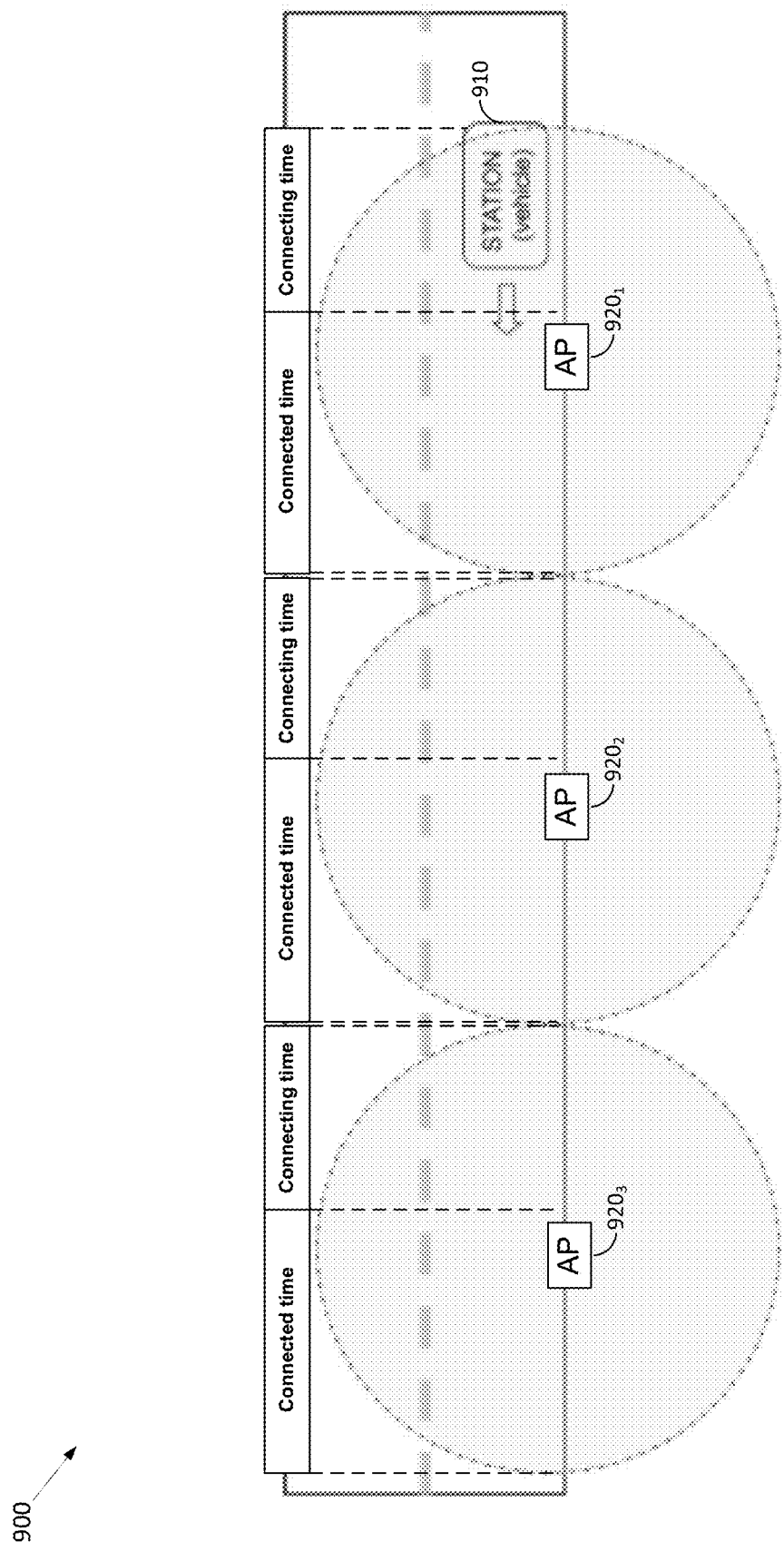
FIG. 9 shows an example use scenario with a moving station connecting to a series of Wi-Fi access points.

FIG. 8 shows an example use scenario with a moving station connecting to a Wi-Fi access point. Shown in FIG. 8 are a moving station 810 and a Wi-Fi access point (AP) 820.

The moving station 810 may comprise a Wi-Fi enabled device or component in a vehicle). In this regard, as used herein vehicles may comprise any machine or mechanical object configured for transporting persons and/or cargo, such as regular cars, motorcycles, taxis, buses, trucks, trains, bicycles, autonomous vehicles, drones, etc., as well as other user devices that may be used on-board vehicles (e.g., an user smartphone, notebook or tablet), that uses their Wi-Fi capabilities to connect to networks' AP (both private or public) located along their trajectory. The moving station may be considered as a single unit or as part of a fleet of moving stations. For example, the moving station 810 may correspond to the combination of the vehicle 710 and the mobile access point (MAP) 720 deployed therein, as described with respect to FIG. 7.

As illustrated in FIG. 8, the moving station 810 moves across the coverage area of the AP 820. In this regard, the time required to establish the connection between the moving station 810 and the AP 820 may be a significant part of the total time the moving station 810 remains within the coverage area (range) of the AP 820. The faster the moving station 810 is moving, the larger portion connection time takes as a portion of the total time (and thus the small portion connection time is).

FIG. 9 shows an example use scenario with a moving station connecting to a series of Wi-Fi access points. Shown in FIG. 9 are a moving station 910 and a series of Wi-Fi access point (APs) $920_i$ (of which 3 APs, AP $920_1$, AP $920_2$, and AP $920_3$ are shown in FIG. 9 as an example). In this regard, the moving station 910 may be similar to the moving station 810 of FIG. 8.

As illustrated in FIG. 9, as the moving station 910 roams among a series of APs (e.g., AP $920_1$, AP $920_2$, and AP $920_3$), it enters and exits each AP coverage area. As with the example use scenario shown in FIG. 8, the connecting time—that is, the total time for the station to connect to each AP—when obtaining coverage within the range of each AP may be significant. This reduces the proportion of time that the station is connected to each AP while in the coverage range of that AP.

Therefore, reducing the time required to establish the connection to Wi-Fi APs (that is, the connecting time) may be desirable because doing so increases the total amount of time the station is effectively connected to each AP. In this regard, in such use scenarios, it may be desirable to optimize connectivity related functions, such as by incorporating measures for shortening the time required for connecting stations to the APs (networks), which may increase significantly the percentage of time effectively connected to the network for this kind of moving stations. In other words, by incorporating measures for reducing the connecting time, the connected times grows larger (as proportion of the total time within the AP's coverage area/range). This may be case both with respect to connecting to a single AP, as illustrated in FIG. 8, or to multiple APs, as illustrated in FIG. 9, where utilizing such connecting optimization measures, when scaled may enable a moving station to connect faster to the APs along its route.

In some instances, use of connecting optimization measures may be combined with other features to further enhance performance, such as by maintaining data relating to previously encountered APs and/or by sharing information among stations. For example, as some vehicles may occasionally pass through a certain place or travel a certain route, other vehicles may repeatedly pass through the same places and travel the same route, even many times in a single day (as do some examples: public transportation buses, school buses, trains and metro, delivery fleets, etc.). In such cases, moving stations may be considered as occasional or frequent users of an AP, depending on the frequency it connects to it in a certain period of time.

At the same time, whenever a station is connected to a given Wi-Fi network, the AP or some other device or server in the network may allocate resources to be used exclusively by the station. Usually this allocation occurs for a certain period of time, according to an estimation of the time the station may stay connected. An example of such resources may be the IP address assigned to the station while it is connected. In this regard, since neither the AP nor the network may have information on how long the station may be connected, the resource may be allocated for a long period of time (in the case of an IP address, usually tens of minutes to a couple of hours).

Doing so, however, may have adverse effects. For example, in instances where during a relative short period of time, a large number of moving stations may be passing across an AP's coverage area, and connecting to the Wi-Fi network for tens of seconds, the AP and/or the Wi-Fi network may face a resource exhaustion, due to resources that were reserved to stations that are not connected to that network anymore. This situation may occur, for example, in user conditions characterized by high traffic flow, such as during rush hour in big cities, where hundreds of vehicles may pass through an AP's coverage area and connect to it. The same AP's may also be intended to provide connectivity services to people walking by or staying close to it.

In some instances, the moving station may directly communicate and share information with other moving stations, particularly those in proximity and/or those utilizing the same route. This may be accomplished by utilizing some peer to peer communication technology as, for example but not exclusively, ad-hoc wireless network, Bluetooth, DSRC, etc., and/or indirectly, such via intermediating service or device (e.g., a cloud based intermediating service). Examples of such interactions are shown in FIG. 10.

Figure 10:
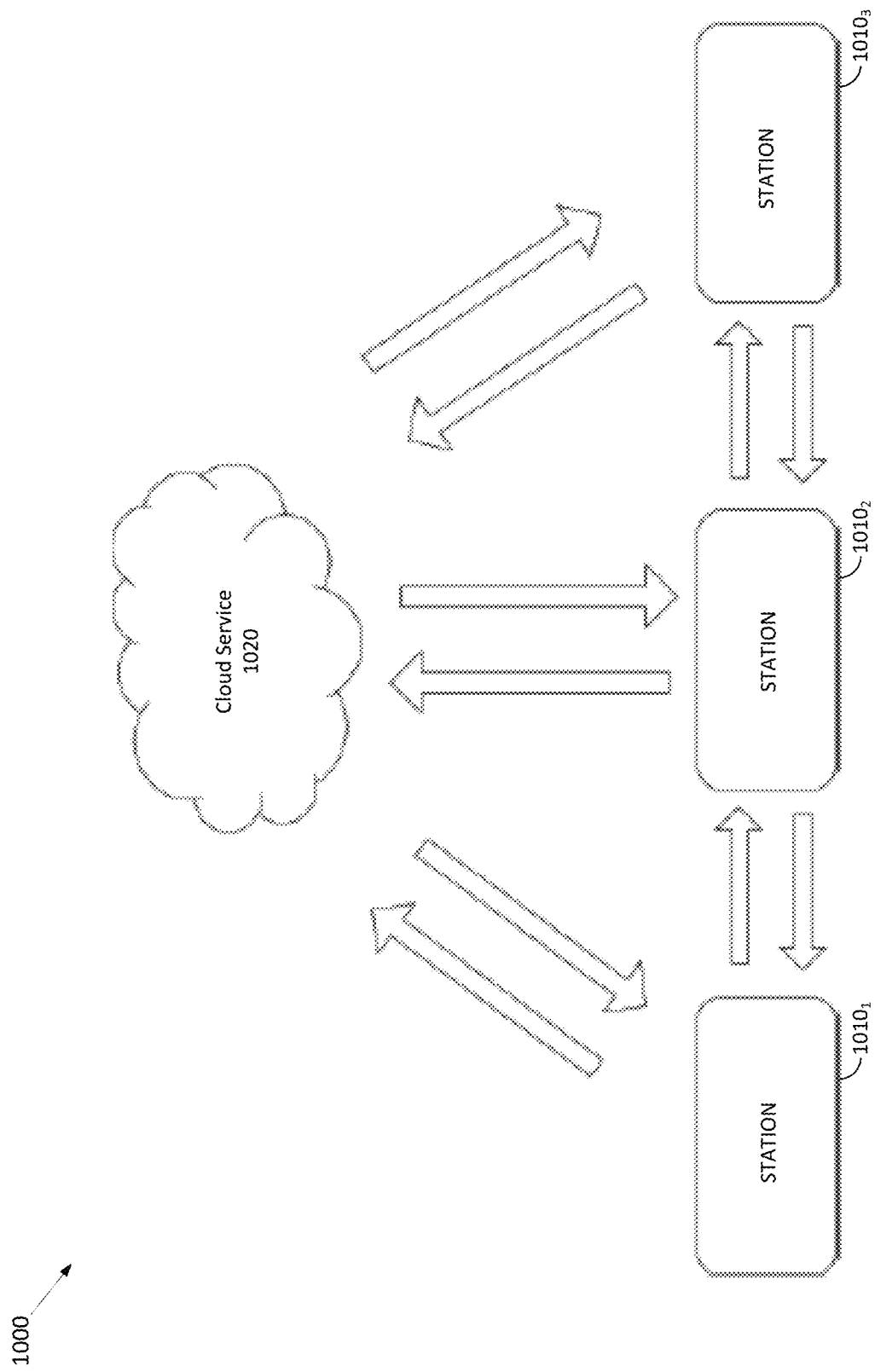
FIG. 10 shows an example use scenario with moving stations communicating and sharing information with other moving stations and/or the Cloud for facilitating dynamic host configuration protocol (DHCP) optimization.

FIG. 10 shows an example use scenario with moving stations communicating and sharing information with other moving stations and/or the Cloud for facilitating dynamic host configuration protocol (DHCP) optimization. Shown in FIG. 10 is plurality of stations $1010_i$ (of which 3 stations, station $1010_1$, station $1010_2$, and station $1010_3$, are shown) and Cloud Service 1020. Each of the stations $1010_i$ may be similar to the station 810 of FIG. 8; the Cloud Service 1020 may be similar to the Cloud 730 of FIG. 7.

In this regard, in the example use scenario shown in FIG. 10, the stations may interact directly to share information (e.g., for optimizing connecting operations) and/or may share such information via the Cloud 1020, as described above. In this regard, in indirect sharing scenarios, the moving station may send information to a cloud based service that may combine with information from other moving stations in order to provide it to a single, many or all moving station(s), information on APs and Wi-Fi networks availability and classification according to a best fitting convenience (which could be, for example, better, faster or even cheaper connectivity).

Connection to the Cloud Service 1020 may be done using Wi-Fi networks or other connectivity technology that may also be supported in the moving station, such as, but not limited to, cellular networks. On the other hand, from the network infrastructure's perspective, APs in a congested or intense traffic area may get overloaded or suffer from resource exhaustion due to too many stations connecting and disconnecting in a short period of time. If the station behavior could be more polite to the access point in the sense of only allocating the resource for the needed time, it would improve overall network operation and simplify its management.

In various implementations in accordance with the present disclosure, optimizing connecting times may comprise optimizing Dynamic Host Configuration Protocol (DHCP) related functions. In this regard, the Dynamic Host Configuration Protocol (DHCP) is used in IP based networks to enable a device to, when connecting to a given network, obtain the required configurations and related information, particularly the IP address to be used by such device while connected to the network. Current version of the DHCP is specified by the RFC 2031 and RFC 2032. In addition, an optional protocol optimization, known as DHCP Rapid Commit Option, is specified by RFC 4039.

In the case of Wi-Fi networks, at some stage of the connection process (in most cases after the station ASSOCIATED state or the 4-way handshake procedure, but the exact moment may differ depending on the used security protocols), the station may need to initiate a DHCP process so it may obtain the IP address and network configuration parameters to use while connected to the network. This set of configuration parameters and the IP address is known as a DHCP lease. The DHCP lease has an expiration time, and it is reserved to the station as long as it is valid. Close to the expiration time, the DHCP provides a mechanism for the station requesting a lease extension. Such extensions may be required as many times as needed, while the station is connected to the network. The DHCP protocol is performed between the station and a DHCP server. The DHCP server may be built-in the AP or, alternatively, in any other network's device or server.

Solutions in accordance with the present disclosure may entail use of optimization measures that may be implemented in the stations, particularly moving stations, to reduce connecting times, such as by reducing, for example, the time required to complete the step of DHCP DYNAMIC IP ADDRESS RESOLUTION. Also, at the same step of DHCP DYNAMIC IP ADDRESS RESOLUTION, operations of the moving station device may be improved to avoid exhausting AP's and/or network's resources, and thus enabling other incoming moving stations being able to connect to that same AP and/or network. In this regard, solutions in accordance with the present disclosure may be adaptively implemented for, e.g., achieving and/or ensuring (e.g., by incorporating use of improvement measures) two primary objectives: A) whenever possible, shortening the amount of time needed to obtain a DHCP lease when (re-)connecting to an AP or multiple APs of the same network, and B) reducing the amount of time that the DHCP server keeps the IP address unnecessarily reserved for a station, thus avoiding IP address exhaustion, particularly during peak use situations (e.g., a large number of moving stations passing through the AP coverage area and connecting for a short period of time).

With respect to the objective of shortening the amount of time needed to obtain DHCP leases (that is objective A), this may be achieved by use of such improvement measures as parallel DHCP Transactions on network re-connection, predicting DHCP DYNAMIC IP ADDRESS RESOLUTION time based on historical data, and/or coordinated peer DHCP lease resolution.

In this regard, with parallel DHCP transactions on network re-connection, when a station is reconnecting to an AP, and the DHCP lease previously obtained is already valid, the station may choose to start a shorted negotiation from the INIT-REBOOT state. If that fails, the station performs a longer negotiation, restarting all over from the INIT state. Thus, improvement may consist in doing two parallel DHCP negotiations, one starting from the INIT state and the other from the INIT-REBOOT state. The first to conclude is accepted and the other is silently discarded.

With predicting DHCP DYNAMIC IP ADDRESS RESOLUTION time based on historical data, it is predicted how long the connection time, including the DHCP negotiation usually takes (both when having or not a valid DHCP lease) based on historical data (e.g., from previous connections). Based on these predictions, if a station, at a given time, may connect to more than one AP, and then choose the one with the shortest predicted connection time.

With coordinated peer DHCP lease resolution, in a scenario where multiple moving stations transmit in sequence (e.g., along the same route/itinerary) for a certain period time, a moving station succeeding to connect to an AP ahead in the route of other moving stations, may negotiate the DHCP leases on behalf of one or more stations that may connect to such AP in the next short period of time.

With respect to the objective of reducing the amount of time that the DHCP server keeps the IP address unnecessarily reserved for a station (that is objective B), this may be achieved by use of such improvement measures as DHCP micro-leases, coordinated peer DHCP release delegation, and/or optimizing DHCP server based on data collection.

In this regard, with DHCP micro-leases, the moving station may infer the time it may be connected to the AP's based on information such as speed, heading and historical connection time to that AP. Using the time prediction may request a very short DHCP lease, just for the required time, avoiding the DHCP server to allocate resources for such station longer than needed.

With coordinated peer DHCP release delegation, when a moving station cannot communicate its departure from the AP's range, in order to avoid the DHCP server to unnecessarily keep allocated resources to such AP, it may request to another station still (or to be) connected to the AP to perform a DHCP RELEASE on its behalf.

With optimizing DHCP server based on data collection, the default DHCP lease time granted by the DHCP servers/AP's may be optimized, such as based on the historical data collected from many moving stations, thus allowing for improving the network infrastructure performance and reliability.

Use of the improvement measures described above may have a direct benefit on moving stations implemented, installed or used in vehicles, such as personal cars, taxis, public transportation buses, trains to increase the useful connection time while passing across AP's coverage area, reducing the time required to roam from one AP to the other and providing the end users a smoother connection experience. Further, have a positive impact on the performance of the network infrastructure, and, by doing this, all the moving stations, as well as the network itself, benefit in a systematic way.

DHCP protocol based elements, messages, and/or functions are used in various example implementation in accordance with the present disclosure. The DHCP protocol comprises different sets of participants (DHCP client (or simply client), DHCP server (or simply client), DHCP relays) and sets of messages, states and rules for each participant. In this regard, it should be understood that in the context of this disclosure, even when referring to the DHCP protocol and/or specifications, the terms "station", "DHCP client", and "client" refer to the same entity or device. Further, when describing various example implementations, only aspects of the DHCP protocol that may be relevant to these implementations are described. Nonetheless, it should be understood that the disclosure is not limited to these aspects, and that these implementations may cover and/or include all the interactions and expected behaviors for all participants in DHCP based solutions.

For example, the relevant DHCP aspects include: 1) certain messages from station to the DHCP server (namely: DHCPDISCOVERY, DHCPREQUEST and DHCPRELEASE), 2) certain messages from the DHCP server to the station (namely: DHCPOFFER, DHCPACK and DHCPNAK), 3) certain protocol states of the station (namely: INIT, SELECTING, REQUESTING, BOUND, RENEWING, REBINDING, INIT-REBOOT and REBOOTING, and 4) information contained in the DHCP messages (namely: transaction id (xid), broadcast flag, client hardware address (chaddr), client identifier, client IP address (depending on the message and state several fields or options may be used), server IP address, network configuration parameters (such as gateway, network address mask, DNS servers, time servers, etc.), lease expiration time, lease renewal time and lease rebind time).

The DHCP protocol may be initiated from the station in two different states: 1) INIT: when the station connects to the network and does not have a valid DHCP lease, and 2) INIT-REBOOT: when the station is reconnecting to a network, has a valid DHCP lease information but needs to confirm with the DHCP server. Depending on the state from which the protocol is started, the station and the DHCP server may exchange a series of messages until the station requests to use a DHCP lease and the DHCP Server acknowledges such request. When this occurs, the station is set into the BOUND state and it is allowed to use the IP address and the network configuration parameters in the DHCP lease, until the lease rebinding time (which is, usually, 87.5% of the total lease expiration time). Along this process, failures may occur, such as: 1) messages becoming lost or corrupted due to transmissions errors and in this case, the station is expected to retry the last message after a timeout time has been elapsed, and 2) DHCP Server not acknowledging the lease requested by the station (responding with a DHCPNAK to the station's DHCPREQUEST message). This is illustrated in FIGS. 11 and 12.

Figure 11:
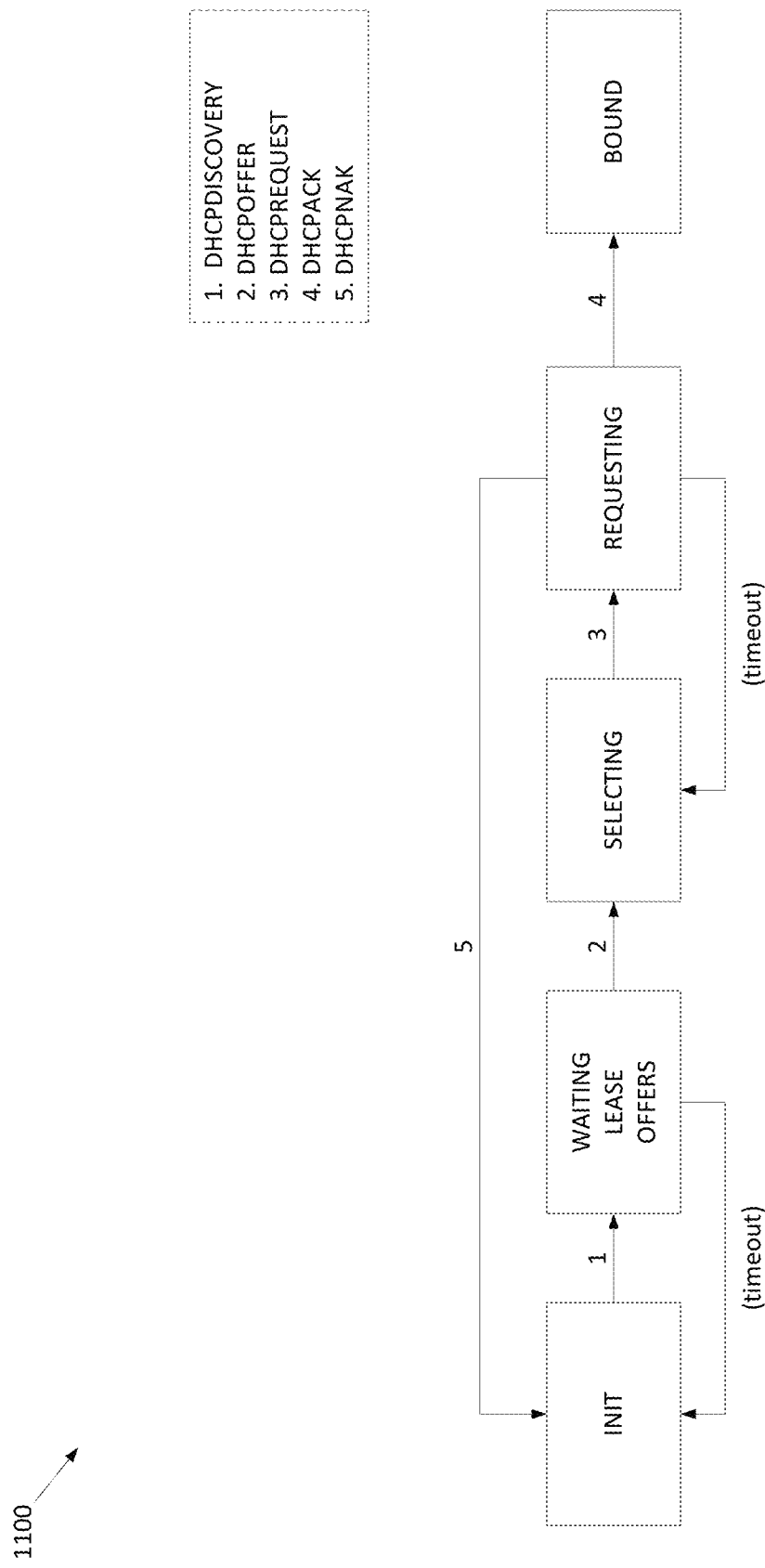
FIG. 11 shows an example dynamic host configuration protocol (DHCP) state transition flow starting with INIT state in station when attempting to setup Wi-Fi connectivity.

FIG. 11 shows an example dynamic host configuration protocol (DHCP) state transition flow starting with INIT state in station when attempting to setup Wi-Fi connectivity. Shown in FIG. 11 is flow 1100 illustrating DHCP states that a station transitions between, starting from the INIT state to reach the BOUND state.

Figure 12:
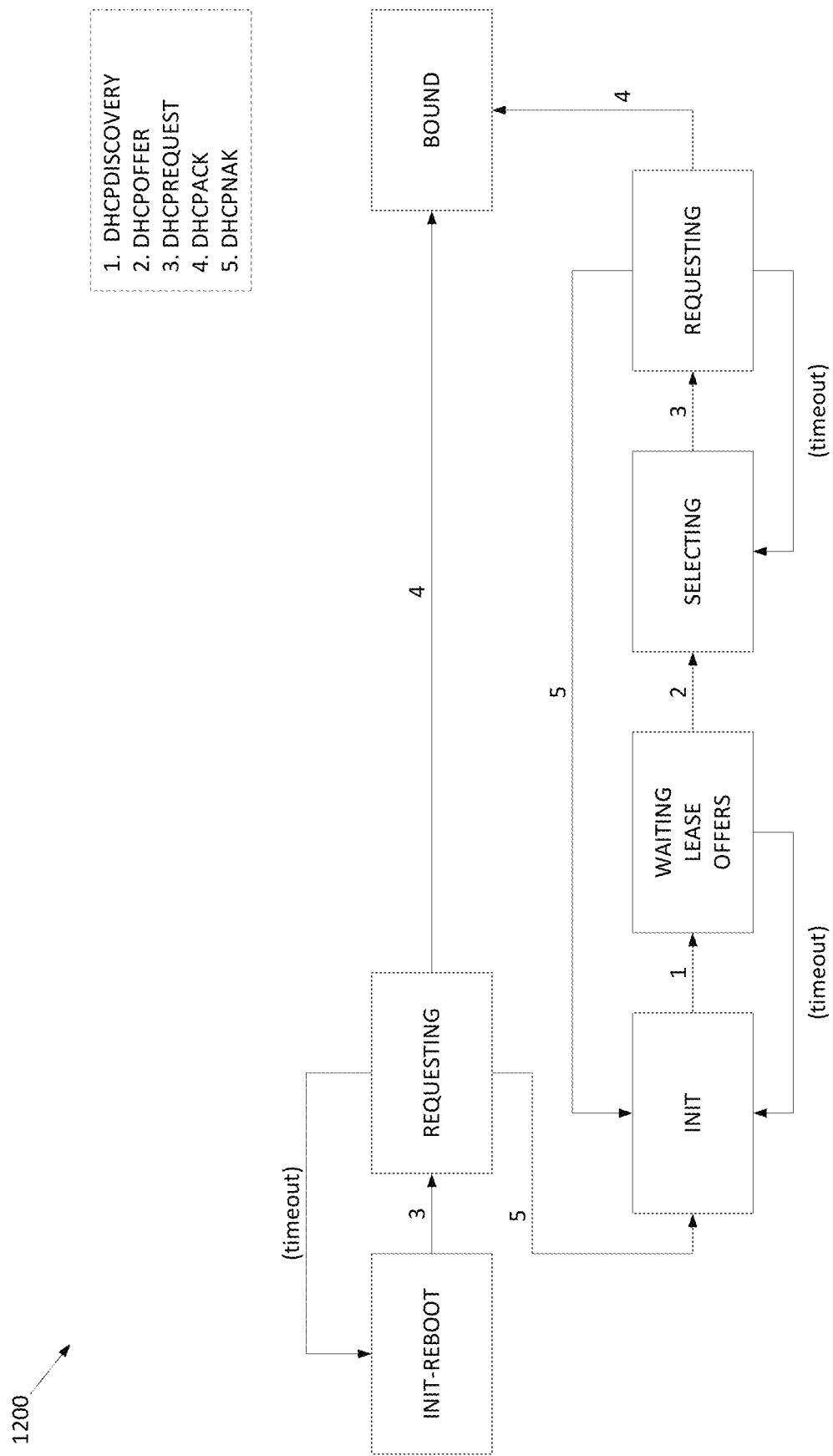
FIG. 12 shows an example dynamic host configuration protocol (DHCP) state transition flow starting with INIT-REBOOT state in station when attempting to setup Wi-Fi connectivity.

FIG. 12 shows an example dynamic host configuration protocol (DHCP) state transition flow starting with INIT- REBOOT state in station when attempting to setup Wi-Fi connectivity. Shown in FIG. 12 is flow 1200 illustrating DHCP states that a station transitions between, starting from the INIT-REBOOT state to reach the BOUND state.

In this regard, until the process required by the DHCP protocol is complete (that is, until reaching the BOUND state), the station does not have a valid IP address (also the DHCP assumes the station has no knowledge of the network at all). Thus, the station may broadcast its output messages to the whole network, including its network interface MAC address in the chaddr field. The DHCP server may usually reply in unicast to the MAC address provided by the station, unless the station includes in its output messages the broadcast flag. In this case, the DHCP server may broadcast to the whole network. As illustrated in FIG. 12, starting from the INIT-REBOOT state may reduce time required for connecting the stations. In this regard, the main purpose of the INIT-REBOOT state is to provide a mechanism to speed up the connection process when a computer or network device is being reboot.

The client may send a DHCPREQUEST message with the DHCP lease and its network interface MAC address in the chaddr field (or, optionally, the information in the client identifier option) in order to identify itself with the DHCP server. The DHCP server may use the client's MAC address (or client identifier option) to confirm that the requested DHCP lease is in fact associated with the client. This process is designed for computers and network devices connected to wired networks but not initially intended for moving stations that may roam among different Wi-Fi networks' APs in a short period of time. Nevertheless, moving stations may try to take advantage of this when they have a previously granted DHCP lease for that network.

Figure 13:
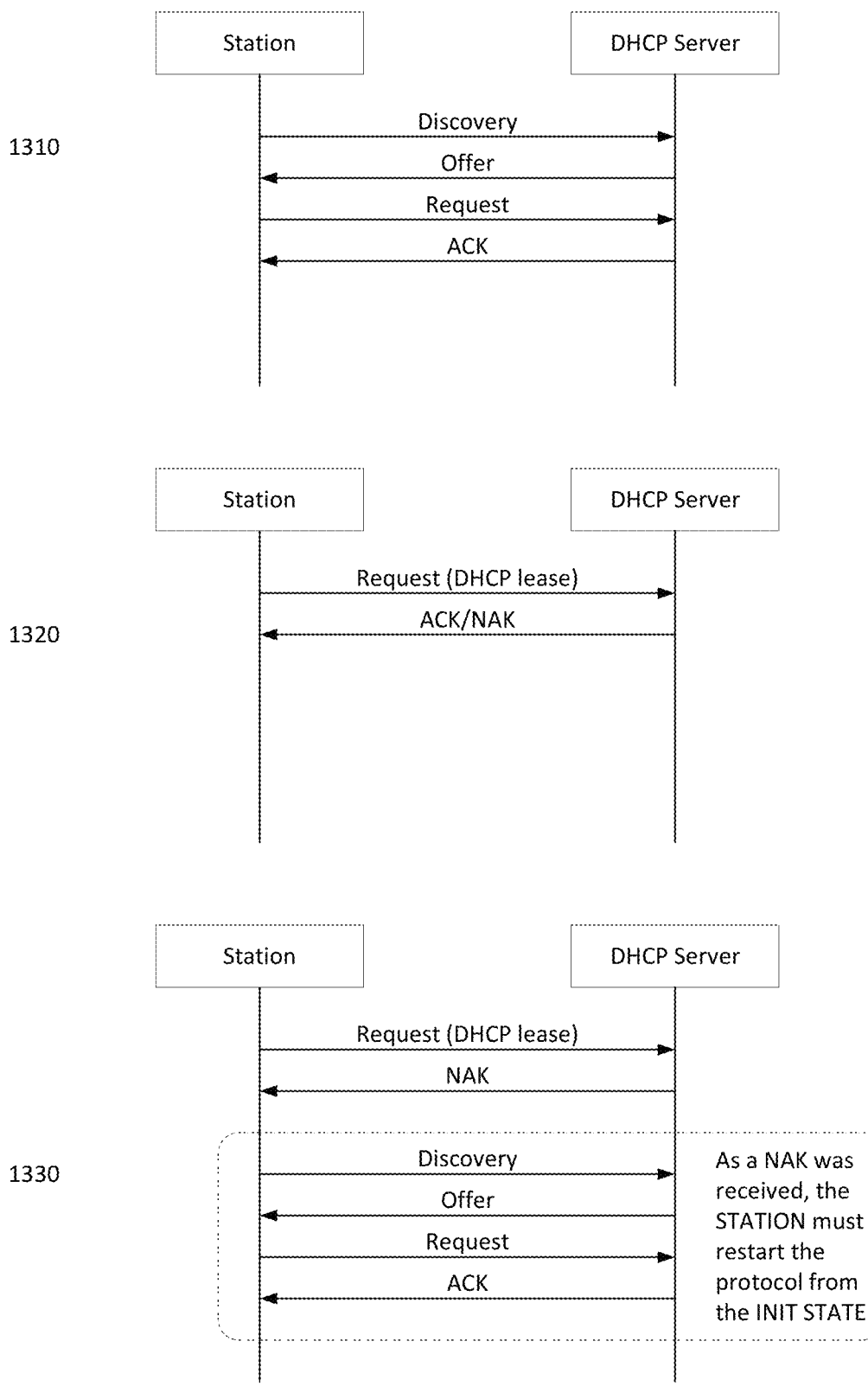
FIG. 13 shows example dynamic host configuration protocol (DHCP) messages exchanges between a station and a DHCP server.

FIG. 13 shows example dynamic host configuration protocol (DHCP) messages exchanges between a station and a DHCP server during various state transition based scenarios. Shown in FIG. 13 are charts 1310, 1320, and 1330.

Chart 1310 depicts the messages exchanged between the station and the DHCP server in INIT based scenario (that is, starting with INIT state, as shown in FIG. 11), particularly a "success" use scenario—that is, when all the messages exchanged are successful (no failures from messages lost nor non-acknowledgement from the DHCP Server).

Chart 1320 depicts the messages exchanged between the station and the DHCP server in INIT-REBOOT based scenario (that is, starting with INIT-REBOOT state, as shown in FIG. 12), particularly a "success" use scenario—that is, when all the messages exchanged are successful (no failures from messages lost nor non-acknowledgement from the DHCP Server).

Chart 1330 depicts the messages exchanged between the station and the DHCP server in INIT-REBOOT based scenario (that is, starting with INIT-REBOOT state, as shown in FIG. 12), particularly a "fail" use scenario—e.g., when the DHCP Server response is a DHCPNAK, setting the station to the INIT state.

In this regard, shown in FIG. 13 in the charts 1310, 1320, and 1330 illustrated therein, the messages exchanged between the station and the DHCP server in the various use scenarios depicted therein. As used herein, the term PATH refers to, and comprises the sequence of messages and events required to the station to move from one of the initial states (INIT or INIT-REBOOT) up to the BOUND state. Examples of paths that may allow the station to move from the INIT state to the BOUND state: 1) PATH I1: [DHCP-DISCOVER, DHCPOFFER, DHCPREQUEST, DHC-PACK], 2) PATH I2: [DHCPDISCOVER, timeout, DHC-PDISCOVER, DHCPOFFER, DHCPREQUEST, timeout, DHCPREQUEST, DHCPACK], and 3) PATH I3: [DHCP-DISCOVER, DHCPOFFER, DHCPREQUEST, timeout, DHCPREQUEST, DHCPNAK, DHCPDISCOVER, DHCPOFFER, DHCPREQUEST, DHCPACK]. Examples of paths that may allow the station to move from the INIT-REBOOT state to the BOUND state include: 1) PATH IR1: [DHCPREQUEST, DHCPACK], 2) PATH IR2: [DHCPREQUEST, timeout, DHCPREQUEST, DHC-PACK], and 3) PATH IR3: [DHCPREQUEST, DHCPNAK, DHCPDISCOVER, DHCPOFFER, DHCPREQUEST, DHCPACK].

Nonetheless, it should be understood that the disclosure is not to these paths, and that the number of theoretical number of paths is much larger (and may be infinite—e.g., without limits on retries, such as after timeout events). However, in some implementations, the station may be configured to limit retries (e.g., by limit the number of retries attempts to pre-defined number, for each transitions and/or for the overall path). Apart from the network speed and connection quality, the time required to complete the DHCP protocol between the station and the DHCP server is strictly related to the number of messages that may need to be exchanged, the number of states the station may need to pass through. In other words, it may be affirmed that the longer the PATH, the longer it is required to complete the DHCP protocol. In this regard, poor connection quality may affect the probability of message loss, increasing the probability of the station waiting idle for a response until the timeout time expires, and just then, retrying to send the same last message sent. When this occurs, the time required to complete DHCP protocol is also increased. The probability of requiring to perform a longer path is related to connection quality and message loss rate.

Further, whenever the DHCP server returns a DHCPNAK response, it has an important impact on the time required to complete the DHCP protocol since it is expected that the station moves down to the INIT state and restart the DHCP protocol all over. This may be very unlikely to occur when the station is in the REQUESTING state, since it should be requesting the same DHCP lease that has been offered by the DHCP seconds immediately before, this may be much more probable in the case where the station is in the REBOOTING state.

On a successful INIT-REBOOT sequence, the station may have its DHCP lease acknowledged by the DHCP with just 2 message exchanges, half the number of messages and amount of time required to perform the default INIT sequence (this is a PATH length of 2 vs. a PATH length of 4). However, if the DHCP server decides the station cannot use that DHCP lease for any reason, and has to start over from the INIT state, the number of exchanged messages increases to six and the amount of time required to complete the protocol may be, at least, 150% of the required to perform the INIT sequence.

The improvement measures disclosed herein aim to reduce or eliminate the time a station requires to confirm a DHCP lease when connecting or reconnecting to a Wi-Fi network. This may be done by implementing, for example, 1) parallel DHCP Transactions on network re-connection, 2) predicting DHCP DYNAMIC IP ADDRESS RESOLUTION time based on historical data, and 3) coordinated peer DHCP lease resolution. Also, additional improvement measures disclosed herein may be used, being focused in providing aid to the management and optimization of the network infrastructure in terms of DHCP as well as to avoid the exhaustion of AP's DHCP leases on intense traffic scenarios.

For example, in geographic points and at times where and when the traffic is very intense and a relative great number of moving stations passes across a certain AP's coverage area and connects to it, for a very short time (for example, less than 30 s), depending on the DHCP lease expiration time, the total number of AP's available leases may exhaust very fast.

In an example use scenario, an AP configured to have 250 available DHCP leases, with a lease expiration time of 300 seconds (5 minutes), may have its leases exhausted if the rate of moving stations connecting to it is over 50 per minute. Since, the moving stations are expected to move across the AP's coverage area in much a shorter period of time, in this exhaustion scenario, the AP's would be idle but at the same time, unable to service newer incoming moving stations. The disclosed improvement measures that may be used in such instances may include DHCP micro-leases, coordinated peer DHCP release delegation, Optimizing DHCP server based on data collection, etc.

In an example implementation, parallel DHCP Transactions on network re-connection is utilized. In this regard, this improvement measure may be applied, e.g., in a station that has been connected to a certain network, then disconnected from it and after a certain interval of time, re-connected to the same network or a network managed by the same DHCP Server. In this situation, the previous DHCP lease may still be valid (not expired). Thus, the station may try to reclaim the DHCP lease by starting the DHCP protocol in the INIT-REBOOT state, and thus, requiring half of the time of the default DHCP protocol starting from the INIT state.

To mitigate the risk of the process taking longer to complete because of a DHCPNAK response from the server, the station starts, in parallel, a DHCP protocol starting from the INIT state. If the INIT-REBOOT sequence fails, it simply, aborts it and continues with the already started INIT sequence. On the other hand, if the INIT-REBOOT sequence succeeds, the INIT sequence is aborted. In the best case scenario, the DHCP lease acknowledgement may take half of the time of the default process. In the worst case, it would not take the same time as the default process.

The station may keep a record of all the APs the station recently connected to, and to the DHCP leases it was granted when connected to each such AP. The station may use the APs basic service set identifiers (BSSID) to uniquely identify each AP. Optionally, the station may have some knowledge on how the APs of a given network are organized and if the DHCP lease obtained when connected to one AP from a given network may be used with another APs of the same network or not. This knowledge may be self-learned by the station based on what succeeded or failed on previous connection attempts or it may be provided from a cloud based assistant system. Once the station decides it may have a usable DHCP lease for the AP it is connecting, proceeds to perform the parallel DHCP transactions procedure. This may be accomplished by the station keeping track of two different protocol states being performed in parallel. This is illustrated in FIG. 14.

Figure 14:
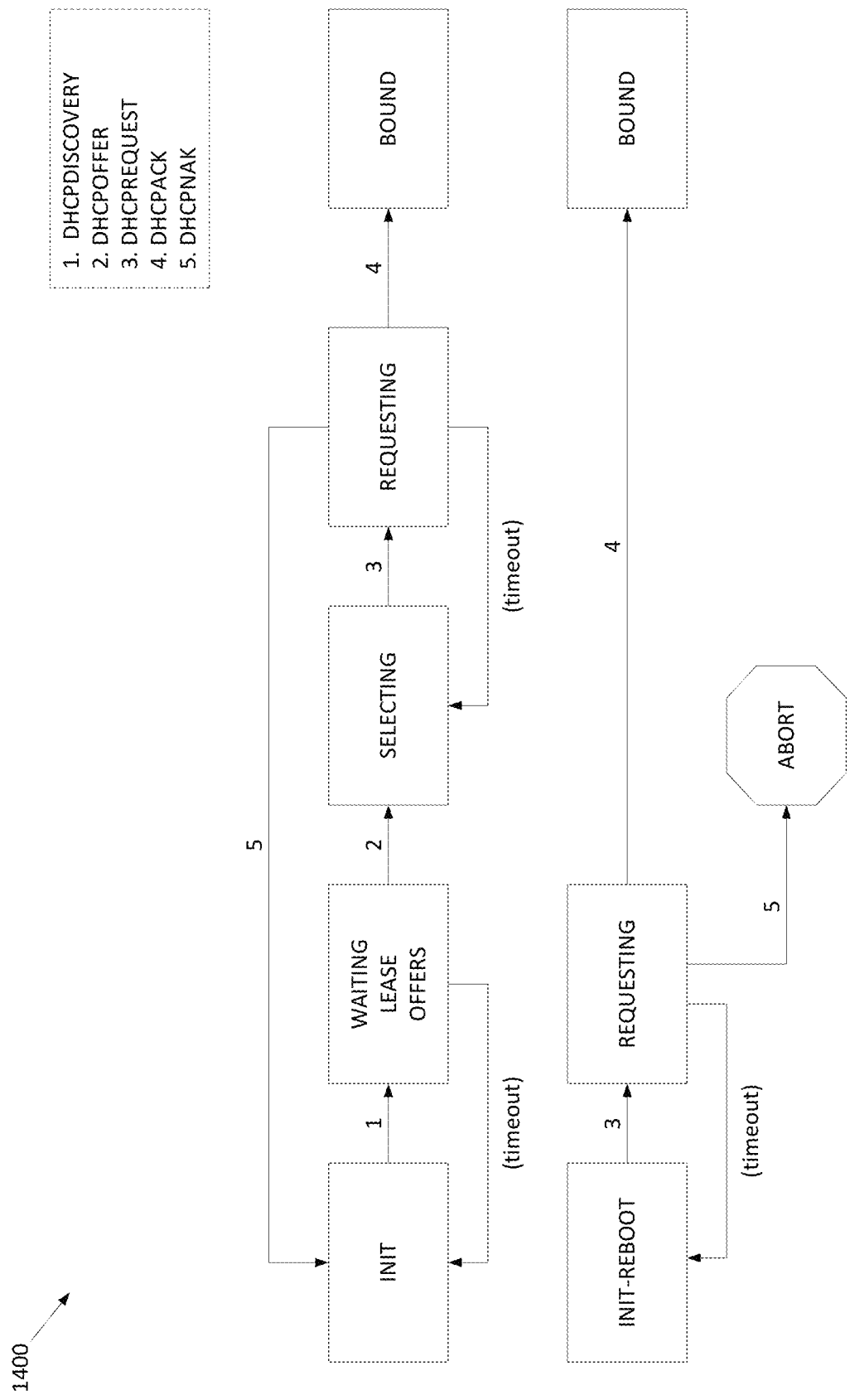
FIG. 14 shows an example parallel dynamic host configuration protocol (DHCP) state transition flow in station when attempting to setup Wi-Fi connectivity.

FIG. 14 shows an example parallel dynamic host configuration protocol (DHCP) state transition flow in station when attempting to setup Wi-Fi connectivity. Shown in FIG. 14 is flow 1400 illustrating DHCP states that a station transitions between when attempting to do so in parallel starting from the INIT state and the INIT-REBOOT state to reach the BOUND state. In this regard, as illustrated in FIG. 14, state transitions starting from the INIT-REBOOT state may be simplified to abort its execution if it receives a DHCPNAK from the DHCP server. The station uses different values for the DHCP transaction id (xid), to differentiate the messages exchanged on each instance of the DHCP protocol being performed.

Figure 15:
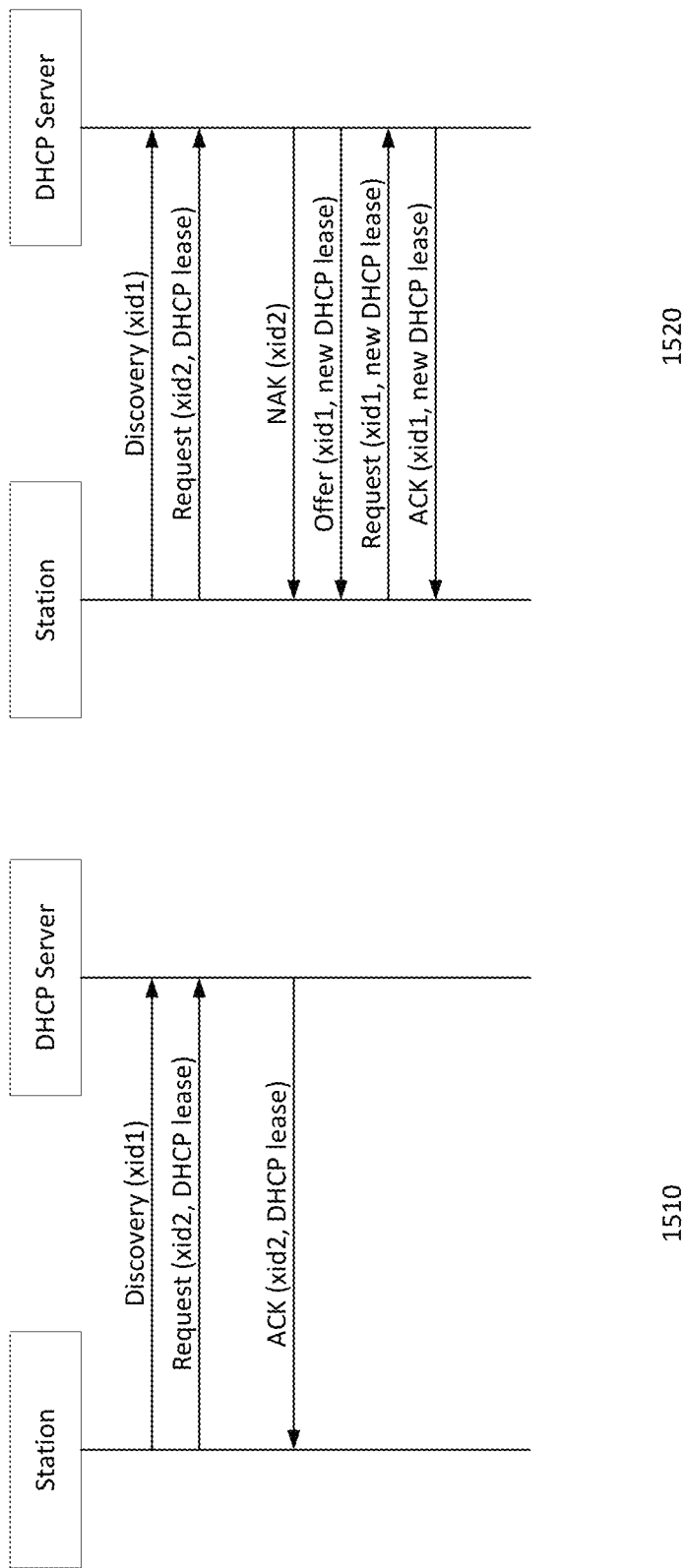
FIG. 15 shows example dynamic host configuration protocol (DHCP) messages exchanges between a station and a DHCP server when using parallel dynamic host configuration protocol (DHCP) state transition.

FIG. 15 shows example dynamic host configuration protocol (DHCP) messages exchanges between a station and a DHCP server when using parallel dynamic host configuration protocol (DHCP) state transition. Shown in FIG. 15 are charts 1510 and 1520.

Chart 1510 depicts the messages exchanged between the station and the DHCP server when all the messages exchanged are successful and the DHCP protocol initiated by the station in the INIT-REBOOT state (using a corresponding transition identifier: xid2) succeeds. On the other hand, chart 1520 depicts the messages exchanged between the station and the DHCP server when the DHCP protocol initiated by the station in the IN IT-REBOOT state (using xid2) fails, but the parallel DHCP protocol initiated from the INIT state (using a different corresponding transition identifier: xid1), continues to perform until completion.

In an example implementation, predicting DHCP DYNAMIC IP ADDRESS RESOLUTION time based on historical data is utilized. In such implementation, the moving station may collect information on the AP's and the amount of time required to complete the DHCP DYNAMIC IP ADDRESS RESOLUTION. Each collected event may contain, but is not limited to, the following information fields: 1) AP's BSSID: this information allows to universally identify a given AP, 2) Method that succeeded in the DHCP lease resolution: INIT or INIT-REBOOT, 3) Time required to obtain/confirm the DHCP lease, and 4) (optionally) DHCP lease information such as its age, remaining time to expire, etc. The collected data may be uploaded to a centralized, commonly accessible Cloud Service (e.g., the Cloud Service 1020 of FIG. 10) or shared with other moving stations. The collected data may be used to predict the time it may require to connect to AP, in both cases of having or not having a valid DHCP lease. In the scenario that a moving station is in the coverage range of more than a single AP, this prediction (optionally in combination with additional information) may be allowed to decide which AP is more convenient for the moving station to connect. This decision capability may be implemented in the moving stations, in Cloud Service, or in both.

In an example implementation, coordinated peer DHCP lease resolution is utilized. In this regard, in a scenario where multiple moving stations transit in sequence along the same route/itinerary for a certain period time, where a moving station succeeding to connect to an AP ahead in the route of other moving stations, that moving station may perform the DHCP protocol on behalf of the other moving stations and obtain the DHCP leases for them before they reach AP coverage area. When the other moving stations connect to the AP, they skip the DHCP DYNAMIC IP ADDRESS RESOLUTION, using the DHCP lease already obtained on their behalf. This coordinated procedure allows the incoming moving stations to reduce the total time required to connect to the AP by skipping the DHCP DYNAMIC IP ADDRESS RESOLUTION.

In order to implement this coordinated procedure, the moving stations may need to have an advanced set of capabilities. For example, the stations delegating the DHCP DYNAMIC IP ADDRESS RESOLUTION to other stations may need to have the following capabilities: share information with other moving stations or Cloud Service (also referred to hereafter as "capability 1"), receive from other moving stations or the Cloud Service information of DHCP leases obtained on its behalf and identification of the AP where this DHCP may be used (also referred to hereafter as "capability 2"), and when connecting to an AP, check if it already has a valid (not expired) DHCP lease information and use it, skipping the DHCP DYNAMIC IP ADDRESS RESOLUTION (also referred to hereafter as "capability 3"). The shared information may include such information as, but not exclusively: position, direction, speed, estimation of station's position or route in a near future time (e.g., between the next 10 seconds up to the next 2 minutes), MAC address of the network interface used to connect to APs, (optionally) the client identifier to be uniquely identify the station with the DHCP Server, (optionally) estimated lease required time or estimated connection time, etc.

The information sharing and the reception of DHCP lease information may be performed by using different technologies, such as, but not limited to, Wi-Fi networks, cellular networks, DSRC, C-V2X, Bluetooth, etc. Further, communication between moving stations may occur directly (in a peer to peer model) or through Cloud Service that relays communication between two stations.

The stations performing the DHCP protocol on behalf of other moving stations may need to have the following capabilities: accepting requests of performing DHCP protocol on behalf of other stations (also referred to hereafter as "capability 4"), performing the DHCP protocol with a DHCP server on behalf of other moving stations (also referred to hereafter as "capability 5"), and informing the DHCP leases obtained on behalf of other moving stations (also referred to hereafter as "capability 6").

In this regard, with respect to accepting requests of performing DHCP protocol on behalf of other stations (that is "capability 4") may be done using information from the other stations, such as: MAC address of the network interface used to connect to APs, (optionally) the client identifier to be uniquely identify the station with the DHCP Server, and (optionally) estimated lease required time or estimated connection time.

With respect to performing the DHCP protocol with a DHCP server on behalf of other moving stations (that is "capability 5") may be done, for example: using the MAC address of other moving station in the chaddr field, (optionally) upon information from the other moving station, using the client identifier option provided by the other moving station, and enabling the broadcast flag on all DHCP messages exchanged with the DHCP server when performing the DHCP protocol on behalf of other stations. By default, DHCP servers are expected to unicast responses to the MAC address of the station performing the DHCP protocol. By enabling the broadcast flag in the DHCP messages, it indicates to the DHCP server that the responses may need to be broadcast to the network, instead of being unicast. This way, the moving station performing the DHCP protocol may receive the responses.

With respect to informing the DHCP leases obtained on behalf of other moving stations (that is "capability 6"), this may be informed directly to the other moving stations or to Cloud Service that would relay this information to the other moving stations. For each DHCP lease obtained for a given station, it may need to inform of, but not limited to, the following: Identification of the moving station to which the DHCP lease applies to, Identification of the AP (usually BSSID), and DHCP lease information. In this regard, the DHCP lease information may include IP address, lease expiration, and as applicable, other network parameters such as, but not limited to, network mask, gateway, broadcast address, DNS servers, etc.

The coordination of this procedure may be implemented within the moving station, Cloud Service, or both. The coordination procedure may need to be capable of: collecting the information shared by stations as described above with respect to capability 1 (also referred to hereafter as "capability 7"), requesting performing DHCP protocol on behalf of the station (also referred to hereafter as "capability 8"), and collecting information on obtained DHCP leases described with above with respect to capability 6, and forward the collected information to the applicable moving station (also referred to hereafter as "capability 9"). In this regard, with respect to requesting performing DHCP protocol on behalf of the station (that is "capability 8"), this may include: identifying a set of APs that it may connect in the near future (e.g., 10 s to 2 min window), for each AP in that identified set decide which moving stations, capable of providing capabilities 4 to 6, are currently connected or may be connected to the given AP, before the moving station reaches the AP's coverage area, and request the chosen stations selected above to perform the DHCP protocol on behalf of the moving station (passing information described in 4).

In this regard, capabilities 7 to 9 may correspond to and represent expected behavior of the system. When these capabilities are implemented in Cloud Service, the decision flow may be centralized. On the other hand, when implemented within one or more moving stations as a distributed system, the decision flow may be different. But, in any case, the expected result is the same.

These capabilities may be grouped into sets combining related capabilities—e.g., set 1 comprising capabilities 1-3, set 2 comprising capabilities 4-6, and set 3 comprising capabilities 7-9. Some moving stations may: implement all sets (that is capabilities 1-3, 4-6, and 7-9), implement just sets 1 and 2 (that is capabilities 1-3 and 4-6), and depend on other stations or the Cloud Service for providing support for set 3 (that is capabilities 7-9), or implement just set 1 (that is capabilities 1-3) and depend on: other stations for support for sets 2 and 3 (that is capabilities 1-3, 4-6, and 7-9) 4-6 and 7-9, and/or other stations for providing support for set 2 (that is capabilities 1-3, 4-6, and 7-9) and the Cloud Service providing support for set 3 (that is capabilities 7-9).

In an example implementation, DHCP micro-leases is utilized. In this regard, the DHCP server may not be able to anticipate how long a moving station may stay connected to the network it manages, so it grants DHCP lease with a fixed configured duration. On the other hand, the moving station may infer the time may be connected to the AP's based on the following information: AP's location, moving station's current position, speed, direction, and (optionally) its expected route, and (optionally) historical data on the amount of time spent connected to this given AP.

The computation of the estimated time the moving station may be connected to the AP may be done by the moving station or Cloud Service providing connectivity insight information to the moving station. The DHCP protocol allows the stations to inform the amount of time expected for the lease in the DHCPDISCOVERY and DCHPREQUEST messages sent to the DHCP server, while performing the DHCP protocol, by setting the IP ADDRESS LEASE TIME option in the DHCPDISCOVERY and/or DHCPREQUEST messages. Such behavior of the moving station may enable the DHCP server to reserve the DHCP lease just for the short period of time the moving station may be connected to it, avoiding the case of the AP not being able to service other moving station incoming later to its coverage area due to an exhaustion of DHCP leases granted to moving stations that are no longer connected to it.

In the eventual case of the moving station remaining connected to the AP for a longer period of time that initially inferred, it may perform the DHCP lease renewal protocol. In this case the amount of time that it expects to be connected may be recomputed based on the same information and informed to the DHCP server in the DHCPREQUEST message, by setting the IP ADDRESS LEASE TIME option accordingly.

In an example implementation, coordinated peer DHCP release delegation is utilized. In this regard, the DHCP protocol provides a mechanism for the station, before disconnecting from the network/AP, to indicate that it may no longer be using the DHCP lease, by sending a DHCPRELEASE message to the DHCP server. In the case of moving station, an AP's disconnection may occur when the station leaves the AP's coverage area, being unable to send the DHCPRELEASE message. If the remaining DHCP lease time is large enough that may pose the AP to a risk of DHCP lease exhaustion, the moving station may delegate the DHCP release on its behalf to other stations in a much similar manner as in coordinated peer DHCP lease resolution. The delegation may be done in a peer to peer way by one moving station requesting this to another moving station still connected to the AP or that may be connected to it shortly, or coordinated by Cloud Service.

The information required from the moving station delegating the release may include DHCP lease information (IP address, lease expiration time, server identifier, client identifier, etc.), MAC address of the moving station's network interface, and AP's BSSID. The information may be provided directly from one moving station to another, or indirectly, such as through Cloud Service coordinating this procedure.

The moving station performing the DHCP release on behalf of other moving station(s) may need to have such capabilities as: 1) receive the information described above, and 2) perform the DHCP release protocol, such as by sending a DHCPRELEASE message to the DHCP server. In this regard, the DHCPRELEASE may include information from the moving station requesting the release as IP address in the ciaddr field, network interface's MAC address in the chaddr field, server identifier in the "Server Identifier" option, and (optionally) client identifier in the "Client Identifier" option.

In an example implementation, Optimizing DHCP server based on data collection is utilized. In this regard, this may be performed based on data that the Cloud Service collects from the moving stations. The collected data may be include, for example: Event timestamp, moving station's properties (e.g., type, position, direction, speed, planned route, etc.), AP's BSSID, network provider, connection's properties (e.g., time required to complete DHCP DYNAMIC IP ADDRESS RESOLUTION, DHCP lease information (such as IP address, server identifier, lease expiration time, etc.), total connection time, data throughput (incoming/outgoing), etc.).

Information may be extracted to compute the optimal operational parameters for the network infrastructure. In the case of the DHCP, the default DHCP lease time granted by the DHCP servers/APs may be optimized accordingly. For example, an AP may be optimized accordingly to the median or average of the total connection time of the moving stations that pass across each AP's coverage area, and a longer period of time if most of the moving stations connect several times a day to the same AP. Also, the number of available DHCP leases may be increased, and more robust hardware devices used in points where peaks of intense traffic usually happen.

Solutions in accordance with the present disclosure incorporate use of unique features that allow for various benefits over existing solutions. For example, some features (e.g., improvement measures) in accordance with the present disclosure allow moving stations implemented, installed, or used in vehicles (e.g., personal cars, taxis, public transportation buses, trains, etc.) to improve performance by increasing the useful connection time (e.g., by reducing connecting time) while passing across AP's coverage area, reducing the time required to roam from one AP to the other and providing the end users a smoother connection experience. In this regard, each feature may provide benefits in different situations.

For example, parallel DHCP transactions on network re-connection may benefit vehicles in urban cities that perform the same route several times a day (such as passenger services, urban public buses, taxis) or eventually, along their routes, cross the AP's coverage area in a short period of time. Predicting DHCP DYNAMIC IP ADDRESS RESOLUTION time based on historical data may benefit any vehicle that is in the coverage range or more than one AP and needs to decide to which AP it is more convenient to connect. Coordinated peer DHCP lease resolution may benefit groups of vehicles displacing along the same route such as highways, roads or main urban avenues.

Other features in accordance with the present disclosure may benefit the performance of the network infrastructure. By doing this, all the moving stations, as well as the network itself may benefit in a systematic way. In this regard, each feature may, again, provide benefits in different situations. For example, DHCP micro-leases and coordinated peer DHCP release delegation may benefit AP's and network management in places and at times where and when the traffic is very intense as well as the moving stations passing across the AP's coverage area since they are more likely to be serviced by such AP. Optimizing DHCP server based on data collection may benefit the network operators by enabling them to optimize the network dimensioning and configuration.

An example supporting dynamic host configuration protocol (DHCP) optimization for Wi-Fi connectivity in a network of moving things, in accordance with the present disclosure, comprises: managing Wi-Fi connectivity of mobile access point (MAP) configured for deployment within a vehicle, the managing comprising applying in one or both of the mobile access point (MAP) and a dynamic host configuration protocol (DHCP) server; one or more timing measures for shortening an amount of time needed to obtain a DHCP lease associated with at least one of a plurality of Wi-Fi access points in the network; and one or more optimization measures for optimizing at least one parameter used by the mobile access point (MAP) to secure DHCP lease for connecting to a particular Wi-Fi access point from the plurality of Wi-Fi access points.

In an example implementation, optimizing the at least one parameter comprises reducing amount of time the at least one parameter is kept reserved by the DHCP server for use by the mobile access point (MAP) when connecting to the particular Wi-Fi access point.

In an example implementation, the at least one parameter comprises an Internet Protocol (IP) address reserved for use in conjunction with the DHCP lease for connecting to the particular Wi-Fi access point.

In an example implementation, applying the one or more timing measures comprises use of parallel DHCP transactions on network re-connection, and wherein the use of parallel DHCP transactions comprises: determining when connecting to a Wi-Fi access point whether the mobile access point (MAP) previously connected to the Wi-Fi access point; when re-connecting to the Wi-Fi access point, determining whether a DHCP lease previously obtained when connected to the Wi-Fi access point is still valid; and when the previously obtained DHCP lease is still valid, using a shortened negotiation process for connecting to the Wi-Fi access point.

In an example implementation, applying the one or more timing measures comprises use of predicting DHCP resolution time based on historical data, and wherein the use of predicting DHCP resolution time based on historical data comprises: determining based on historical data connection time predictions for one or more of the plurality of Wi-Fi access points when within communication range of the mobile access point (MAP); and selecting based on the connection time predictions between the one or more of one or more of the plurality of Wi-Fi access points.

In an example implementation, the method further comprises generating at least a portion of the historical data based previous connections of the mobile access point (MAP).

In an example implementation, applying the one or more timing measures comprises use of coordinated peer DHCP lease resolution, and wherein the use of coordinated peer DHCP lease resolution comprises: determining when the mobile access point (MAP) is within a plurality of mobile access points moving in sequence; and when one mobile access point of plurality of mobile access points succeeds in connecting to a Wi-Fi access point, negotiating by the one mobile access point DHCP leases on behalf of one or more other ones of the plurality of mobile access points.

In an example implementation, the method further comprises determining the one or more other ones of the plurality of mobile access points based on preset selection criteria, wherein the preset selection criteria comprise connecting to the Wi-Fi access point within predefined period of time.

In an example implementation, applying the one or more optimization measures comprises use of DHCP micro-leases, and wherein the use of DHCP micro-leases comprises: estimating by the mobile access point (MAP) predicted time for connecting to a Wi-Fi access point based on context information; and based on predicted time, requesting a very short DHCP lease, wherein the very short DHCP lease is limited to only required connection time, and avoiding the very short DHCP lease is setup without use of the DHCP server.

In an example implementation, the context information comprises one or both of movement related information and connectivity related information, the movement related information comprising one or both of speed and direction, and the connectivity related information comprising historical connection time to the Wi-Fi access point.

In an example implementation, applying the one or more optimization measures comprises use of coordinated peer DHCP release delegation, wherein the use of coordinated peer DHCP release delegation comprises: in response to determination that the mobile access point (MAP) in unable to communicate its departure from communication range of a Wi-Fi access point, identifying one other mobile access point (MAP); and requesting from the one other mobile access point (MAP) handling a DHCP release process on its behalf.

In an example implementation, the method further comprises identifying the one other mobile access point (MAP) based on determination that the one other mobile access point (MAP) is currently connected or shortly will connect to the Wi-Fi access point.

In an example implementation, applying the one or more optimization measures comprises use of DHCP server optimization based on data collection, and wherein the use of DHCP server optimization based on data collection comprises adjusting default DHCP lease time based on historical data, wherein the historical data is collected from a plurality of mobile access points.

An example system for supporting dynamic host configuration protocol (DHCP) optimization for Wi-Fi connectivity in a network of moving things, in accordance with the present disclosure, comprises a mobile access point (MAP) configured for deployment within a vehicle, with the mobile access point (MAP) comprising: at least one communication circuit configured to communicate signals for transmission and reception of data; at least one storage circuit configured to store instructions and data; and at least one processing circuit configured to, based at least in part on instructions and/or data stored in the at least one storage circuit, manage Wi-Fi connectivity of mobile access point (MAP) via the at least one communication circuit, the managing comprising applying, independently or in conjunction with a dynamic host configuration protocol (DHCP) server associated with the network, one or more timing measures for shrtening an amount of time needed to obtain a DHCP lease associated with at least one of a plurality of Wi-Fi access points in the network; and one or more optimization measures for optimizing at least one parameter used by the mobile access point (MAP) to secure DHCP lease for connecting to a particular Wi-Fi access point from the plurality of Wi-Fi access points.

In an example implementation, the applying the one or more timing measures comprises use of parallel DHCP transactions on network re-connection, and wherein the at least one processing circuit is configured to when performing the use of parallel DHCP transactions: determine when connecting to a Wi-Fi access point whether the mobile access point (MAP) previously connected to the Wi-Fi access point; when re-connecting to the Wi-Fi access point, determine whether a DHCP lease previously obtained when connected to the Wi-Fi access point is still valid; and when the previously obtained DHCP lease is still valid, use a shortened negotiation process for connecting to the Wi-Fi access point.

In an example implementation, applying the one or more timing measures comprises use of predicting DHCP resolution time based on historical data, and wherein the at least one processing circuit is configured to, when performing the use of predicting DHCP resolution time based on historical data: determine based on historical data connection time predictions for one or more of the plurality of Wi-Fi access points when within communication range of the mobile access point (MAP); and select based on the connection time predictions between the one or more of one or more of the plurality of Wi-Fi access points.

In an example implementation, the at least one processing circuit is further configured to generate at least a portion of the historical data based previous connections of the mobile access point (MAP).

In an example implementation, applying the one or more timing measures comprises use of coordinated peer DHCP lease resolution, and wherein the at least one processing circuit is configured to, when performing the use of coordinated peer DHCP lease resolution, perform based on determination that the mobile access point (MAP) is within a plurality of mobile access points moving in sequence one or both of: negotiating DHCP leases associated with a Wi-Fi access point on behalf of one or more other ones of the plurality of mobile access points, based on a success connection by the mobile access point (MAP) to the Wi-Fi access point; and using DHCP lease negotiated by other one mobile access point (MAP) of the plurality of mobile access points based on a success connection by the other one mobile access point (MAP) to the Wi-Fi access point.

In an example implementation, applying the one or more optimization measures comprises use of DHCP microleases, and wherein the at least one processing circuit is configured to when performing the use of DHCP microleases: estimate predicted time for connecting to a Wi-Fi access point based on context information; and based on predicted time, request a very short DHCP lease, wherein the very short DHCP lease is limited to only required connection time, and avoiding the very short DHCP lease is setup without use of the DHCP server.

In an example implementation, applying the one or more optimization measures comprises use of coordinated peer DHCP release delegation, and wherein the at least one processing circuit is configured to, when performing the use of coordinated peer DHCP release delegation: in response to determination that the mobile access point (MAP) in unable to communicate its departure from communication range of a Wi-Fi access point, identifying one other mobile access point (MAP); and requesting from the one other mobile access point (MAP) handling a DHCP release process on its behalf.

In an example implementation, the at least one processing circuit is further configured to identify the one other mobile access point (MAP) based on determination that the one other mobile access point (MAP) is currently connected or shortly will connect to the Wi-Fi access point.

In an example implementation, applying the one or more optimization measures comprises use of DHCP server optimization based on data collection, and wherein the at least one processing circuit is configured to when performing the use of DHCP server optimization based on data collection, adjust default DHCP lease time based on historical data, wherein the historical data is collected from a plurality of mobile access points.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

In accordance with various aspects of this disclosure, examples of the networks and/or components thereof presented herein are provided in U.S. Provisional Patent Application Ser. No. 62/222,192, entitled "Communication Network of Moving Things," filed Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Patent Application Ser. No. 62/221,997, entitled "Integrated Communication Network for A Network of Moving Things," filed Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Patent Application Ser. No. 62/222,016, entitled "Systems and Methods for Synchronizing a Network of Moving Things," filed Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Patent Application Ser. No. 62/222,042, entitled "Systems and Methods for Managing a Network of Moving Things," filed Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Patent Application Ser. No. 62/222,066, entitled "Systems and Methods for Monitoring a Network of Moving Things," filed Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Patent Application Ser. No. 62/222,077, entitled "Systems and Methods for Detecting and Classifying Anomalies in a Network of Moving Things," filed Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Patent Application Ser. No. 62/222,098, entitled "Systems and Methods for Managing Mobility in a Network of Moving Things," filed Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Patent Application Ser. No. 62/222,121, entitled "Systems and Methods for Managing Connectivity a Network of Moving Things," filed Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Patent Application Ser. No. 62/222,135, entitled "Systems and Methods for Collecting Sensor Data in a Network of Moving Things," filed Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Patent Application Ser. No. 62/222,145, entitled "Systems and Methods for Interfacing with a Network of Moving Things," filed Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Patent Application Ser. No. 62/222,150, entitled "Systems and Methods for Interfacing with a User of a Network of Moving Things," filed Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Patent Application Ser. No. 62/222,168, entitled "Systems and Methods for Data Storage and Processing for a Network of Moving Things," filed Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Patent Application Ser. No. 62/222,183, entitled "Systems and Methods for Vehicle Traffic Management in a Network of Moving Things," filed Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Patent Application Ser. No. 62/222,186, entitled "Systems and Methods for Environmental Management in a Network of Moving Things," filed Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Patent Application Ser. No. 62/222,190, entitled "Systems and Methods for Port Management in a Network of Moving Things," filed Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Patent Application Ser. No. 62/244,828, entitled "Utilizing Historical Data to Correct GPS Data in a Network of Moving Things," filed Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Patent Application Ser. No. 62/244,930, entitled "Using Anchors to Correct GPS Data in a Network of Moving Things," filed Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Patent Application Ser. No. 62/246,368, entitled "Systems and Methods for Inter-Application Communication in a Network of Moving Things," filed Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Patent Application Ser. No. 62/246,372, entitled "Systems and Methods for Probing and Validating Communication in a Network of Moving Things," filed Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Patent Application Ser. No. 62/250,544, entitled "Adaptive Rate Control for Vehicular Networks," filed Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Patent Application Ser. No. 62/273,878, entitled "Systems and Methods for Reconfiguring and Adapting Hardware in a Network of Moving Things," filed Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Patent Application Ser. No. 62/253,249, entitled "Systems and Methods for Optimizing Data Gathering in a Network of Moving Things," filed Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Patent Application Ser. No. 62/257,421, entitled "Systems and Methods for Delay Tolerant Networking in a Network of Moving Things," filed Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Patent Application Ser. No. 62/265,267, entitled "Systems and Methods for Improving Coverage and Throughput of Mobile Access Points in a Network of Moving Things," filed Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Patent Application Ser. No. 62/270,858, entitled "Channel Coordination in a Network of Moving Things," filed Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Patent Application Ser. No. 62/257,854, entitled "Systems and Methods for Network Coded Mesh Networking in a Network of Moving Things," filed Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Patent Application Ser. No. 62/260,749, entitled "Systems and Methods for Improving Fixed Access Point Coverage in a Network of Moving Things," filed Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Patent Application Ser. No. 62/273,715, entitled "Systems and Methods for Managing Mobility Controllers and Their Network Interactions in a Network of Moving Things," filed Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Patent Application Ser. No. 62/281,432, entitled "Systems and Methods for Managing and Triggering Handovers of Mobile Access Points in a Network of Moving Things," filed Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Patent Application Ser. No. 62/268,188, entitled "Captive Portal-related Control and Management in a Network of Moving Things," filed Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Patent Application Ser. No. 62/270,678, entitled "Systems and Methods to Extrapolate High-Value Data from a Network of Moving Things," filed Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Patent Application Ser. No. 62/272,750, entitled "Systems and Methods for Remote Software Update and Distribution in a Network of Moving Things," filed Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Patent Application Ser. No. 62/278,662, entitled "Systems and Methods for Remote Configuration Update and Distribution in a Network of Moving Things," filed Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Patent Application Ser. No. 62/286,243, entitled "Systems and Methods for Adapting a Network of Moving Things Based on User Feedback," filed Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Patent Application Ser. No. 62/278,764, entitled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Patent Application Ser. No. 62/286,515, entitled "Systems and Methods for Self-Initialization and Automated Bootstrapping of Mobile Access Points in a Network of Moving Things," filed Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Patent Application Ser. No. 62/295,602, entitled "Systems and Methods for Power Management in a Network of Moving Things," filed Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Patent Application Ser. No. 62/299,269, entitled "Systems and Methods for Automating and Easing the Installation and Setup of the Infrastructure Supporting a Network of Moving Things," filed Feb. 24, 2016, which is hereby incorporated herein by reference in its entirety.

Further, in accordance with various aspects of this disclosure, the networks and/or components thereof presented herein are provided with systems and methods for dynamic management and control of multiple Wi-Fi radios, non-limiting examples of which are provided in U.S. patent application Ser. No. 16/829,262, filed Mar. 25, 2020, which is hereby incorporated herein by reference in its entirety.

Further, in accordance with various aspects of this disclosure, the networks and/or components thereof presented herein are provided with systems and methods for dynamic and automatic connection to Wi-Fi access points using multiple authentication and operation modes, non-limiting examples of which are provided in U.S. patent application Ser. No. 16/891,668, on Jun. 3, 2020, which is hereby incorporated herein by reference in its entirety.

Further, in accordance with various aspects of this disclosure, the networks and/or components thereof presented herein are provided with systems and methods for intelligent offloading of traffic to public and private Wi-Fi hotspots leveraging the Cloud, non-limiting examples of which are provided in U.S. Provisional Patent Application Ser. No. 16/905,061, filed Jun. 18, 2020, which is hereby incorporated herein by reference in its entirety.

Further, in accordance with various aspects of this disclosure, the networks and/or components thereof presented herein are provided with systems and methods for Cloud-based data-driven Wi-Fi connectivity management in a network of moving things including, for example, autonomous vehicles, non-limiting examples of which are provided in U.S. patent application Ser. No. 16/984,933, filed Aug. 4, 2020, which is hereby incorporated herein by reference in its entirety.

Further, in accordance with various aspects of this disclosure, the networks and/or components thereof presented herein are provided with systems and methods for adaptive and dynamic Wi-Fi scanning policies in a network of moving things including, for example, autonomous vehicles, non-limiting examples of which are provided in U.S. patent application Ser. No. 16/984,953, filed Aug. 4, 2020, which is hereby incorporated herein by reference in its entirety.

Further, in accordance with various aspects of this disclosure, the networks and/or components thereof presented herein are provided with systems and methods for dynamic gathering, classification, and accounting of metadata in a network of moving things, non-limiting examples of which are provided in U.S. patent application Ser. No. 17/106,535, filed Nov. 30, 2020, which is hereby incorporated herein by reference in its entirety.

Further, in accordance with various aspects of this disclosure, the networks and/or components thereof presented herein are provided with systems and methods for billing of metadata in a network of moving things, non-limiting examples of which are provided in U.S. patent application Ser. No. 17/106,430, filed Nov. 30, 2020, which is hereby incorporated herein by reference in its entirety.

Further, in accordance with various aspects of this disclosure, the networks and/or components thereof presented herein are provided with systems and methods for in-vehicle data-driven connectivity optimization in a network of moving things, non-limiting examples of which are provided in U.S. patent application Ser. No. 17/143,426, filed Jan. 7, 2021, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method for supporting dynamic host configuration protocol (DHCP) optimization for Wi-Fi connectivity in a network of moving things, the method comprising:

managing Wi-Fi connectivity of mobile access point (MAP) configured for deployment within a vehicle, the managing comprising applying in one or both of the mobile access point (MAP) and a dynamic host configuration protocol (DHCP) server:
  one or more timing measures for shortening an amount of time needed to obtain a DHCP lease associated with at least one of a plurality of Wi-Fi access points in the network; and
  one or more optimization measures for optimizing at least one parameter used by the mobile access point (MAP) to secure a DHCP lease for connecting to a particular Wi-Fi access point from the plurality of Wi-Fi access points;
wherein applying the one or more timing measures comprises use of coordinated peer DHCP lease resolution, and wherein the use of coordinated peer DHCP lease resolution comprises:
  determining when the mobile access point (MAP) is within a plurality of mobile access points moving in sequence; and
  when one mobile access point of plurality of mobile access points succeeds in connecting to a Wi-Fi access point, negotiating by the one mobile access point DHCP leases on behalf of one or more other ones of the plurality of mobile access points.

2. The method of claim 1, wherein optimizing the at least one parameter comprises reducing amount of time the at least one parameter is kept reserved by the DHCP server for use by the mobile access point (MAP) when connecting to the particular Wi-Fi access point.

3. The method of claim 1, wherein the at least one parameter comprises an Internet Protocol (IP) address reserved for use in conjunction with the DHCP lease for connecting to the particular Wi-Fi access point.

4. The method of claim 1, wherein applying the one or more timing measures comprises use of parallel DHCP transactions on network re-connection, and wherein the use of parallel DHCP transactions comprises:
  determining when connecting to a Wi-Fi access point whether the mobile access point (MAP) previously connected to the Wi-Fi access point;
  when re-connecting to the Wi-Fi access point, determining whether a DHCP lease previously obtained when connected to the Wi-Fi access point is still valid; and
  when the previously obtained DHCP lease is still valid, using a shortened negotiation process for connecting to the Wi-Fi access point.

5. The method of claim 1, wherein applying the one or more timing measures comprises use of predicting DHCP resolution time based on historical data, and wherein the use of predicting DHCP resolution time based on historical data comprises:
  determining based on historical data connection time predictions for one or more of the plurality of Wi-Fi access points when within communication range of the mobile access point (MAP); and
  selecting based on the connection time predictions between the one or more of one or more of the plurality of Wi-Fi access points.

6. The method of claim 5, further comprising generating at least a portion of the historical data based previous connections of the mobile access point (MAP).

7. The method of claim 1, further comprising determining the one or more other ones of the plurality of mobile access points based on preset selection criteria, wherein the preset selection criteria comprise connecting to the Wi-Fi access point within predefined period of time.

8. The method of claim 1, wherein applying the one or more optimization measures comprises use of DHCP server optimization based on data collection, and wherein the use of DHCP server optimization based on data collection comprises adjusting default DHCP lease time based on historical data, wherein the historical data is collected from a plurality of mobile access points.

9. A system for supporting dynamic host configuration protocol (DHCP) optimization for Wi-Fi connectivity in a network of moving things, the system comprising:
  a mobile access point (MAP) configured for deployment within a vehicle, the mobile access point (MAP) comprising:
    at least one communication circuit configured to communicate signals for transmission and reception of data;
    at least one storage circuit configured to store instructions and data; and
    at least one processing circuit configured to, based at least in part on instructions and/or data stored in the at least one storage circuit, manage Wi-Fi connectivity of mobile access point (MAP) via the at least one communication circuit, the managing comprising applying, independently or in conjunction with a dynamic host configuration protocol (DHCP) server associated with the network:
      one or more timing measures for shortening an amount of time needed to obtain a DHCP lease associated with at least one of a plurality of Wi-Fi access points in the network; and
      one or more optimization measures for optimizing at least one parameter used by the mobile access point (MAP) to secure DHCP lease for connecting to a particular Wi-Fi access point from the plurality of Wi-Fi access points;
    wherein applying the one or more timing measures comprises use of coordinated peer DHCP lease resolution, and wherein the at least one processing circuit is configured to, when performing the use of coordinated peer DHCP lease resolution, perform based on determination that the mobile access point (MAP) is within a plurality of mobile access points moving in sequence one or both of:
      negotiating DHCP leases associated with a Wi-Fi access point on behalf of one or more other ones of the plurality of mobile access points, based on a success connection by the mobile access point (MAP) to the Wi-Fi access point; and
      using DHCP lease negotiated by other one mobile access point (MAP) of the plurality of mobile access points based on a success connection by the other one mobile access point (MAP) to the Wi-Fi access point.

10. The system of claim 9, wherein applying the one or more timing measures comprises use of parallel DHCP transactions on network re-connection, and wherein the at least one processing circuit is configured to when performing the use of parallel DHCP transactions:
  determine when connecting to a Wi-Fi access point whether the mobile access point (MAP) previously connected to the Wi-Fi access point;
  when re-connecting to the Wi-Fi access point, determine whether a DHCP lease previously obtained when connected to the Wi-Fi access point is still valid; and when the previously obtained DHCP lease is still valid, use a shortened negotiation process for connecting to the Wi-Fi access point.

11. The system of claim 9, wherein applying the one or more timing measures comprises use of predicting DHCP resolution time based on historical data, and wherein the at least one processing circuit is configured to when performing the use of predicting DHCP resolution time based on historical data:
determine based on historical data connection time predictions for one or more of the plurality of Wi-Fi access points when within communication range of the mobile access point (MAP); and
select based on the connection time predictions between the one or more of one or more of the plurality of Wi-Fi access points.

12. The system of claim 11, wherein the at least one processing circuit is configured to generate at least a portion of the historical data based previous connections of the mobile access point (MAP).

13. The system of claim 9, wherein applying the one or more optimization measures comprises use of DHCP server optimization based on data collection, and wherein the at least one processing circuit is configured to when performing the use of DHCP server optimization based on data collection, adjust default DHCP lease time based on historical data, wherein the historical data is collected from a plurality of mobile access points.

14. A method for supporting dynamic host configuration protocol (DHCP) optimization for Wi-Fi connectivity in a network of moving things, the method comprising:
managing Wi-Fi connectivity of mobile access point (MAP) configured for deployment within a vehicle, the managing comprising applying in one or both of the mobile access point (MAP) and a dynamic host configuration protocol (DHCP) server:
one or more timing measures for shortening an amount of time needed to obtain a DHCP lease associated with at least one of a plurality of Wi-Fi access points in the network; and
one or more optimization measures for optimizing at least one parameter used by the mobile access point (MAP) to secure a DHCP lease for connecting to a particular Wi-Fi access point from the plurality of Wi-Fi access points;
wherein applying the one or more optimization measures comprises use of DHCP micro-leases, and wherein the use of DHCP micro-leases comprises:
estimating by the mobile access point (MAP) predicted time for connecting to a Wi-Fi access point based on context information; and
based on predicted time, requesting a very short DHCP lease, wherein the very short DHCP lease is limited to only required connection time, and avoiding the very short DHCP lease is setup without use of the DHCP server.

15. The method of claim 14, wherein optimizing the at least one parameter comprises reducing amount of time the at least one parameter is kept reserved by the DHCP server for use by the mobile access point (MAP) when connecting to the particular Wi-Fi access point.

16. The method of claim 14, wherein the at least one parameter comprises an Internet Protocol (IP) address reserved for use in conjunction with the DHCP lease for connecting to the particular Wi-Fi access point.

17. The method of claim 14, wherein applying the one or more timing measures comprises use of parallel DHCP transactions on network re-connection, and wherein the use of parallel DHCP transactions comprises:
determining when connecting to a Wi-Fi access point whether the mobile access point (MAP) previously connected to the Wi-Fi access point;
when re-connecting to the Wi-Fi access point, determining whether a DHCP lease previously obtained when connected to the Wi-Fi access point is still valid; and
when the previously obtained DHCP lease is still valid, using a shortened negotiation process for connecting to the Wi-Fi access point.

18. The method of claim 14, wherein applying the one or more timing measures comprises use of predicting DHCP resolution time based on historical data, and wherein the use of predicting DHCP resolution time based on historical data comprises:
determining based on historical data connection time predictions for one or more of the plurality of Wi-Fi access points when within communication range of the mobile access point (MAP); and
selecting based on the connection time predictions between the one or more of one or more of the plurality of Wi-Fi access points.

19. The method of claim 18, further comprising generating at least a portion of the historical data based previous connections of the mobile access point (MAP).

20. The method of claim 14, wherein the context information comprises one or both of movement related information and connectivity related information, the movement related information comprising one or both of speed and direction, and the connectivity related information comprising historical connection time to the Wi-Fi access point.

21. The method of claim 14, wherein applying the one or more optimization measures comprises use of DHCP server optimization based on data collection, and wherein the use of DHCP server optimization based on data collection comprises adjusting default DHCP lease time based on historical data, wherein the historical data is collected from a plurality of mobile access points.

22. A method for supporting dynamic host configuration protocol (DHCP) optimization for Wi-Fi connectivity in a network of moving things, the method comprising:
managing Wi-Fi connectivity of mobile access point (MAP) configured for deployment within a vehicle, the managing comprising applying in one or both of the mobile access point (MAP) and a dynamic host configuration protocol (DHCP) server:
one or more timing measures for shortening an amount of time needed to obtain a DHCP lease associated with at least one of a plurality of Wi-Fi access points in the network; and
one or more optimization measures for optimizing at least one parameter used by the mobile access point (MAP) to secure a DHCP lease for connecting to a particular Wi-Fi access point from the plurality of Wi-Fi access points;
wherein applying the one or more optimization measures comprises use of coordinated peer DHCP release delegation, and wherein the use of coordinated peer DHCP release delegation comprises:
in response to determination that the mobile access point (MAP) in unable to communicate its departure from communication range of a Wi-Fi access point, identifying one other mobile access point (MAP); and requesting from the one other mobile access point (MAP) handling a DHCP release process on its behalf.

23. The method of claim 22, wherein optimizing the at least one parameter comprises reducing amount of time the at least one parameter is kept reserved by the DHCP server for use by the mobile access point (MAP) when connecting to the particular Wi-Fi access point.

24. The method of claim 22, wherein the at least one parameter comprises an Internet Protocol (IP) address reserved for use in conjunction with the DHCP lease for connecting to the particular Wi-Fi access point.

25. The method of claim 22, wherein applying the one or more timing measures comprises use of parallel DHCP transactions on network re-connection, and wherein the use of parallel DHCP transactions comprises:
determining when connecting to a Wi-Fi access point whether the mobile access point (MAP) previously connected to the Wi-Fi access point;
when re-connecting to the Wi-Fi access point, determining whether a DHCP lease previously obtained when connected to the Wi-Fi access point is still valid; and
when the previously obtained DHCP lease is still valid, using a shortened negotiation process for connecting to the Wi-Fi access point.

26. The method of claim 22, wherein applying the one or more timing measures comprises use of predicting DHCP resolution time based on historical data, and wherein the use of predicting DHCP resolution time based on historical data comprises:
determining based on historical data connection time predictions for one or more of the plurality of Wi-Fi access points when within communication range of the mobile access point (MAP); and
selecting based on the connection time predictions between the one or more of one or more of the plurality of Wi-Fi access points.

27. The method of claim 26, further comprising generating at least a portion of the historical data based previous connections of the mobile access point (MAP).

28. The method of claim 22, further comprising identifying the one other mobile access point (MAP) based on determination that the one other mobile access point (MAP) is currently connected or shortly will connect to the Wi-Fi access point.

29. The method of claim 22, wherein applying the one or more optimization measures comprises use of DHCP server optimization based on data collection, and wherein the use of DHCP server optimization based on data collection comprises adjusting default DHCP lease time based on historical data, wherein the historical data is collected from a plurality of mobile access points.

30. A system for supporting dynamic host configuration protocol (DHCP) optimization for Wi-Fi connectivity in a network of moving things, the system comprising:
a mobile access point (MAP) configured for deployment within a vehicle, the mobile access point (MAP) comprising:
at least one communication circuit configured to communicate signals for transmission and reception of data;
at least one storage circuit configured to store instructions and data; and
at least one processing circuit configured to, based at least in part on instructions and/or data stored in the at least one storage circuit, manage Wi-Fi connectivity of mobile access point (MAP) via the at least one communication circuit, the managing comprising applying, independently or in conjunction with a dynamic host configuration protocol (DHCP) server associated with the network:
one or more timing measures for shortening an amount of time needed to obtain a DHCP lease associated with at least one of a plurality of Wi-Fi access points in the network; and
one or more optimization measures for optimizing at least one parameter used by the mobile access point (MAP) to secure DHCP lease for connecting to a particular Wi-Fi access point from the plurality of Wi-Fi access points;
wherein applying the one or more optimization measures comprises use of DHCP micro-leases, and wherein the at least one processing circuit is configured to when performing the use of DHCP micro-leases:
estimate predicted time for connecting to a Wi-Fi access point based on context information; and
based on predicted time, request a very short DHCP lease, wherein the very short DHCP lease is limited to only required connection time, and avoiding the very short DHCP lease is setup without use of the DHCP server.

31. The system of claim 30, wherein applying the one or more timing measures comprises use of parallel DHCP transactions on network re-connection, and wherein the at least one processing circuit is configured to when performing the use of parallel DHCP transactions:
determine when connecting to a Wi-Fi access point whether the mobile access point (MAP) previously connected to the Wi-Fi access point;
when re-connecting to the Wi-Fi access point, determine whether a DHCP lease previously obtained when connected to the Wi-Fi access point is still valid; and
when the previously obtained DHCP lease is still valid, use a shortened negotiation process for connecting to the Wi-Fi access point.

32. The system of claim 30, wherein applying the one or more timing measures comprises use of predicting DHCP resolution time based on historical data, and wherein the at least one processing circuit is configured to when performing the use of predicting DHCP resolution time based on historical data:
determine based on historical data connection time predictions for one or more of the plurality of Wi-Fi access points when within communication range of the mobile access point (MAP); and
select based on the connection time predictions between the one or more of one or more of the plurality of Wi-Fi access points.

33. The system of claim 32, wherein the at least one processing circuit is configured to generate at least a portion of the historical data based previous connections of the mobile access point (MAP).

34. The system of claim 30, wherein applying the one or more optimization measures comprises use of DHCP server optimization based on data collection, and wherein the at least one processing circuit is configured to when performing the use of DHCP server optimization based on data collection, adjust default DHCP lease time based on historical data, wherein the historical data is collected from a plurality of mobile access points.

35. A system for supporting dynamic host configuration protocol (DHCP) optimization for Wi-Fi connectivity in a network of moving things, the system comprising:

a mobile access point (MAP) configured for deployment within a vehicle, the mobile access point (MAP) comprising:
- at least one communication circuit configured to communicate signals for transmission and reception of data;
- at least one storage circuit configured to store instructions and data; and
- at least one processing circuit configured to, based at least in part on instructions and/or data stored in the at least one storage circuit, manage Wi-Fi connectivity of mobile access point (MAP) via the at least one communication circuit, the managing comprising applying, independently or in conjunction with a dynamic host configuration protocol (DHCP) server associated with the network:
  - one or more timing measures for shortening an amount of time needed to obtain a DHCP lease associated with at least one of a plurality of Wi-Fi access points in the network; and
  - one or more optimization measures for optimizing at least one parameter used by the mobile access point (MAP) to secure DHCP lease for connecting to a particular Wi-Fi access point from the plurality of Wi-Fi access points;
- wherein applying the one or more optimization measures comprises use of coordinated peer DHCP release delegation, and wherein the at least one processing circuit is configured to when performing the use of coordinated peer DHCP release delegation:
  - in response to determination that the mobile access point (MAP) in unable to communicate its departure from communication range of a Wi-Fi access point, identifying one other mobile access point (MAP); and
  - requesting from the one other mobile access point (MAP) handling a DHCP release process on its behalf.

36. The system of claim 35, wherein applying the one or more timing measures comprises use of parallel DHCP transactions on network re-connection, and wherein the at least one processing circuit is configured to when performing the use of parallel DHCP transactions:
- determine when connecting to a Wi-Fi access point whether the mobile access point (MAP) previously connected to the Wi-Fi access point;
- when re-connecting to the Wi-Fi access point, determine whether a DHCP lease previously obtained when connected to the Wi-Fi access point is still valid; and
- when the previously obtained DHCP lease is still valid, use a shortened negotiation process for connecting to the Wi-Fi access point.

37. The system of claim 35, wherein applying the one or more timing measures comprises use of predicting DHCP resolution time based on historical data, and wherein the at least one processing circuit is configured to when performing the use of predicting DHCP resolution time based on historical data:
- determine based on historical data connection time predictions for one or more of the plurality of Wi-Fi access points when within communication range of the mobile access point (MAP); and
- select based on the connection time predictions between the one or more of one or more of the plurality of Wi-Fi access points.

38. The system of claim 37, wherein the at least one processing circuit is configured to generate at least a portion of the historical data based previous connections of the mobile access point (MAP).

39. The system of claim 35, wherein the at least one processing circuit is configured identify the one other mobile access point (MAP) based on determination that the one other mobile access point (MAP) is currently connected or shortly will connect to the Wi-Fi access point.

40. The system of claim 35, wherein applying the one or more optimization measures comprises use of DHCP server optimization based on data collection, and wherein the at least one processing circuit is configured to when performing the use of DHCP server optimization based on data collection, adjust default DHCP lease time based on historical data, wherein the historical data is collected from a plurality of mobile access points.

* * * * *